United States Patent [19]

Konishi et al.

[11] Patent Number: 5,227,933
[45] Date of Patent: Jul. 13, 1993

[54] TAPE LOADING DEVICE OF MAGNETIC RECORDING/REPRODUCING APPARATUS HAVING COMMON GUIDE GROOVE FOR PLURALITY OF TAPE GUIDE POSTS

[75] Inventors: Akio Konishi, Hirakata; Hideaki Yoshio, Moriguchi; Toshio Makabe; Koichiro Hirabayashi, both of Osaka; Yoshiyuki Saito, Kadoma, all of Japan

[73] Assignee: Matsushita Electric Industrial Co., Ltd., Kadoma, Japan

[21] Appl. No.: 597,301

[22] Filed: Oct. 12, 1990

[30] Foreign Application Priority Data

Oct. 13, 1989 [JP] Japan ................ 1-267321
Oct. 13, 1989 [JP] Japan ................ 1-267322
Oct. 13, 1989 [JP] Japan ................ 1-267323
Oct. 13, 1989 [JP] Japan ................ 1-267324
Oct. 13, 1989 [JP] Japan ................ 1-267325
Oct. 13, 1989 [JP] Japan ................ 1-267329

[51] Int. Cl.5 .......................... G11B 15/665
[52] U.S. Cl. .......................... 360/85
[58] Field of Search ................ 360/85, 95

[56] References Cited

U.S. PATENT DOCUMENTS 4,561,029 12/1985 Maeda ................ 360/85
4,692,823 9/1987 Gwon ................ 360/85
4,697,214 9/1987 Sasakawa ................ 360/85
4,704,644 11/1987 Takenouchi ................ 360/85
4,899,235 2/1990 Kano et al. ................ 360/85
4,928,191 5/1990 Kaku et al. ................ 360/85
4,985,788 1/1991 Kano et al. ................ 360/85

FOREIGN PATENT DOCUMENTS 0083932 7/1983 European Pat. Off. .
0240925 10/1987 European Pat. Off. .
60-209957 10/1985 Japan .
61-137254 6/1986 Japan .
61-188768 8/1986 Japan .
61-230656 10/1986 Japan .
1-49155 2/1989 Japan .

Primary Examiner—Robert S. Tupper
Attorney, Agent, or Firm—Wenderoth, Lind & Ponack

[57] ABSTRACT

A tape loading device of a magnetic recording/reproducing apparatus, includes: first and second tape guide posts for taking a tape, extending between a supply side reel and a winding side reel of a tape cassette, from the tape cassette and travelling the tape to a predetermined position located outside the tape cassette; first and second loading guides for respectively guiding travels of the first and second tape guide posts to take out the tape from the tape cassette to the predetermined position; a common guide for joining a part of the first loading guide and a part of second loading guide into the same path so as to guide the first and second loading guides in order; and a branch pointer arm for switching between the common guide and the first and second loading guides, the branch pointer arm being urged to open one loading guide of the loading guides and close the other loading guide thereof, and pressed by one tape guide post of the tape guide posts when the tape guide post, moving along the common guide in precedence to the other tape guide post, has guided by the one loading guide which has been opened, whereby the one loading guide is closed and the other loading guide is opened to guide the other tape guide post of the tape guide posts.

17 Claims, 15 Drawing Sheets

Fig. 1

TAPE LOADING DEVICE OF MAGNETIC RECORDING/REPRODUCING APPARATUS HAVING COMMON GUIDE GROOVE FOR PLURALITY OF TAPE GUIDE POSTS

BACKGROUND OF THE INVENTION

The present invention relates to a tape loading device of a magnetic recording/reproducing apparatus such as a cassette type video tape recorder.

As a conventional tape loading device of a cassette type video tape recorder for recording or reproducing a video signal by taking out a magnetic tape from a tape cassette and winding it around the peripheral surface of a rotation drum disposed in the vicinity of the tape cassette, the following type tape loading device is known: A magnetic tape is taken out of the cassette tape using a moving type loading roller post disposed on the supply reel side and winding reel side of a rotation drum and then, the magnetic tape is wound around the rotation drum from both sides thereof.

For example, as shown in FIG. 17, a loading roller post 201 disposed on the winding reel side is moved in the direction shown by the arrow 202 so as to take a magnetic tape 203 out of a tape cassette and at the same time, a loading roller post 204 disposed on the supply reel side is moved in the direction shown by the arrow 205 so as to take the magnetic tape 203 out of the tape cassette. Thereafter, the magnetic tape 203 is wound around a rotation drum 206 from both sides thereof.

However, in order to make the rotation drum compact so that a magnetic recording/reproducing apparatus such as a camera-integrated video tape recorder can be made to be compact, it is necessary to wind the magnetic tape deeply around the rotation drum. To this end, as shown in FIG. 18, the loading roller post 201 disposed on the winding reel side is moved to the back of the rotation drum 206 in the direction shown by the arrow 207. At this time, in order to secure the tape path of the magnetic tape 203, a post 208 is moved in the direction shown by the arrow 209 so as to expand the tape path. The posts 201, 204, and 208 are moved by an appropriate driving means and a loading guide for providing the travel path of the posts 201, 204, and 208, respectively. In FIGS. 17 and 18, reference numeral 210 denotes a fixed type pinch roller. The magnetic tape 203 is sandwiched between the pinch roller 210 and a capstan 212 which moves from the tape cassette side. Thus, the force for driving the magnetic tape 203 is imparted thereto. Reference numeral 213 denotes a device for driving the capstan 212.

In the above known construction, two moving paths are required to move the posts 201 and 208 in the directions shown by the arrows 207 and 209 using each loading guide. Therefore, the spaces for the moving paths are required, which makes it very difficult to make the tape loading device compact. Further, a driving mechanism is necessary for each of the posts 201 and 208, which also makes it difficult to make the device compact.

In order to overcome such a difficulty, it is preferable to provide a construction in which the loading guides denoted by the arrows 207 and 209 are joined with each other to have the same travel path in a certain portion of their movement. But providing a joining portion causes a problem that it is difficult to correctly guide each post 201 and 208 to a predetermined loading terminating position. In order to reduce the size of a tape loading device, it is necessary to reduce the space in which the two posts are moved.

As shown in FIG. 19, a device is known in which the capstan 212 is positioned outside the tape cassette 211 and the pinch roller 210 is moved by the pinch roller arm 215 from the interior of the tape cassette 211 toward the capstan 212 in the direction shown by the arrow 214. According to this construction, the driving device 213 for driving the capstan 212 can be mounted at a position spaced from the tape cassette 211 and similarly to the tape loading devices as shown in FIGS. 17 and 18, the driving device 213 and the tape cassette 211 do not overlap with each other. Thus, the tape loading device as shown in FIG. 19 has an advantage that the thickness thereof in the direction perpendicular to the sheet showing FIG. 19 can be reduced.

Accordingly, the rotation drum 206 can be made to be compact and the thickness of the device can be reduced by adopting a construction which is a combination of the device shown in FIG. 18 and the device shown in FIG. 19. Thus, a compact magnetic recording/reproducing apparatus can be manufactured.

According to such a combination as described above, it may occur that the travel path of the posts 201 and 208 represented by the arrows 207 and 209 in FIG. 18 and the travel path of the pinch roller 210 shown by the arrow 214 in FIG. 19 intersect with each other. When such an intersection occurs, the pinch roller arm 215 and a rail-shaped loading guide for guiding the posts 201 and 208 are likely to interfere with each other before a loading operation is started in the state in which the posts 201 and 208 and the pinch roller 210 are positioned within the tape cassette 211. Therefore, it is necessary to separate the members with a space particularly in the thickness direction of a magnetic recording/reproducing apparatus so as to avoid the occurrence of such an interference, which leads to the increase of the size of the apparatus. This is a main factor for preventing a magnetic recording/reproducing compact apparatus from being manufactured.

Additionally, an annular first driving ring and an annular second driving ring are rotatably held around the rotation drum. The first driving ring is positioned below the second driving ring. The first driving ring and the second driving ring are supported with a certain space provided therebetween by three ring supporting rollers, respectively. A first loading guide guides a first boat of the first loading roller post, and a second loading guide guides a second boat of the second loading roller post. When a first driving gear rotates clockwise, the first driving ring rotates counterclockwise, thus moving the first loading roller post to the loading position along the first loading guide, and the second driving ring rotates clockwise, thus moving the second loading roller post to the loading position along the second loading guide. Thus, the magnetic tape is taken out of the cassette by the loading roller posts, respectively and wound around the rotation drum from both sides thereof.

According to the above construction, the first driving ring and the second driving ring supported by the three ring supporting rollers, respectively cannot be spaced more than a predetermined interval due to the constructions thereof. Therefore, the construction is not suitable for a camera-integrated type VTR which is required to be thin. Since the first and second driving rings are annular, they require the predetermined space corresponding to the width thereof throughout the periphery of the rotation drum. Thus, the construction cannot be made to be less compact than the above interval provided therebetween and moreover, the weight thereof cannot be reduced.

SUMMARY OF THE INVENTION

Accordingly, an essential object of the present invention is to provide a tape loading device in which a space for the moving path of two posts can be reduced, the two posts can be moved by one driving mechanism so that the tape loading device is compact, and the two posts can be reliably guided to each predetermined loading terminating position.

Another important object of the present invention is to provide a compact tape loading device in which interference between the pinch roller arm and the loading guide can be prevented without providing the device with a space for avoiding the interference.

A further object of the present invention is to provide a loading post driving device which can be constructed to be thinner than the conventional one, and in which a space for the driving ring can be reduced so that a compact and light device can be manufactured, and which is effective for being applied to a camera-integrated type VTR.

In accomplishing these and other objects, according to a first aspect of the present invention, there is provided a tape loading device of a magnetic recording/reproducing apparatus, comprising: first and second tape guide posts for taking out a tape from a tape cassette and moving the tape to a predetermined position located outside the tape cassette; and first and second loading guides for respectively guiding to paths of travel of the first and second tape guide posts to take out the tape from the tape cassette to the predetermined position, the first and second loading guides having part of the same path in common.

According to a second aspect of the present invention, there is provided a tape loading device of a magnetic recording/reproducing apparatus, comprising: first and second tape guide posts for taking a tape, extending between a supply side reel and a winding side reel of a tape cassette, from the tape cassette and moving the tape to a predetermined position located outside the tape cassette; first and second loading guides for respectively guiding travels of the first and second tape guide posts to take out the tape from the tape cassette to the predetermined position; a common guide for joining a part of the first loading guide and a part of second loading guide into the same path so as to guide the first and second loading guides in order; and a branch pointer arm for switching between the common guide and the first and second loading guides, the branch pointer arm being urged to open one loading guide of the loading guides and close the other loading guide thereof, and pressed by one tape guide post of the tape guide posts when the tape guide post, moving along the common guide in precedence to the other tape guide post, is guided by the one loading guide which has been opened, whereby the one loading guide is closed and the other loading guide is opened to guide the other tape guide post of the tape guide posts.

According to a third aspect of the present invention, there is provided a tape loading device of a magnetic recording/reproducing apparatus, wherein the first and second loading guides are composed of a pair of edges constituting both sides of the travel path of each tape guide post; and the branch pointer arm constitutes a part of the edges of the first and second loading guides in a branch portion of the common guide and the first loading guide as well as the second loading guide.

According to this construction of the first through third aspects of the present invention, the first and second loading guides for guiding the travels of the first and second tape guide posts are joined with each other by the common guide. Therefore, it is only necessary to provide a space for one loading guide in the common guide. Further, the moving distances of both tape guide posts can be equalized, which makes it possible to move both by the same driving mechanism. The first and the second tape guide posts move in order along the common guide with one preceding to the other. During this period, the preceding tape guide post reliably moves into one loading guide opened by the branch point arm. The preceding tape guide post which has moved into one loading guide presses the branch pointer arm. Thus, one loading guide is closed and the other loading guide is opened. Therefore, the branch pointer arm allows the succeeding tape guide post to reliably move into the other loading guide. Further, since the branch pointer arm constitutes a part of the edges of the first and second loading guides in the branch portion of the common guide and the first loading guide as well as the second loading guide, the branch pointer arm has both a branching function and a guiding function of the tape guide post. Therefore, compared with a device comprising a member having a branching function and a member having a guiding function, the number of parts constituting the device can be reduced and the space for accomplishing both functions can be reduced.

According to a fourth aspect of the present invention, there is provided a tape loading device of a magnetic recording/reproducing apparatus, comprising: a tape guide post for taking out a tape, extending between a supply side reel and a winding side reel of a tape cassette, from the tape cassette and moving the tape to a predetermined position; a loading guide for constituting a travel path of the tape guide post to take out the tape from the tape cassette to the predetermined position; a pinch roller arm pivotal about an axis thereof, a part of the loading start side of the loading guide being formed on the pinch roller arm; and a pinch roller mounted on the pinch roller arm and moving, according to pivotal motion of the pinch roller arm, on a path intersecting the travel path of the tape guide post from an interior of the tape cassette to a position near a capstan provided outside the tape cassette so as to sandwich the tape, taken out from the tape cassette by the tape guide post, between itself and the capstan.

According to this construction of the fourth aspect of the present invention, since a part of the loading starting side of the loading guide for guiding the travel of the tape guide post is integrally formed on the pinch roller arm itself, the interference between the pinch roller arm and the loading guide can be prevented without providing a non-interference space therebetween. Accordingly, a tape loading device having a small thickness can be manufactured.

According to a fifth aspect of the present invention, there is provided a tape loading device comprising: a circular arc guiding member disposed along a periphery of a rotation drum; a circular arc driving member rotatably guided along the guiding member; two loading arms rotatably supported at one end of a periphery of the circular arc driving member; and tape guide posts each mounted on a supporting base rotatably mounted on the other end of each of the loading arms.

According to the above-described construction of the fifth aspect of the present invention, the supporting base of the two tape guide posts can be moved along the peripheral surface of the rotation drum by the circular arc driving member through the two loading arms unlike the conventional construction in which the supporting bases are driven by separate driving means. That is, only one driving means is employed to move the two supporting bases, which contributes to the manufacture of a compact tape loading device.

When the two supporting bases are pressed against a respective stopper located at a predetermined position after the two supporting bases are moved by the driving means, there is a possibility that only one of the two supporting bases is placed in position because force is non-uniformly applied to the two bases due to the difference in the lengths of the loading arms and the positions of the stoppers. But the shaft extending through the elongated opening of the circular arc driving member moves within the elongated opening, which prevents the non-uniform pressing force from being applied to the supporting bases. Accordingly, the two tape guide posts can be held with a uniform force applied thereto, so that the travel of a magnetic tape can be stabilized. Further, the two loading arms are held by each stopper by increasing the angle between the two loading arms, so that each supporting base can generate a great pressing force by a slight amount of pressing force applied to the shaft.

Furthermore, during a loading operation, the two tape guide posts can be moved in the direction in which they cross each other by the two loading arms which are long and short. Thus, a rational tape path can be formed.

According to a sixth aspect of the present invention, there is provided a tape guide post driving apparatus comprising: a circular arc gear having a tooth portion on one of an outer peripheral surface and an inner peripheral surface thereof and a tape guide post mounted on an end thereof through a rotatable loading arm; and a wall, disposed along a peripheral portion of a rotation drum, for guiding the outer and inner peripheral surfaces of the circular arc gear.

According to the above-described construction of the sixth aspect of the present invention, even though circular arc gears for driving each loading post positioned on the supply reel side and on the winding reel side partly overlap with each other vertically, the interval between the circular arc gears can be greatly reduced compared with the conventional construction in which ring supporting rollers are employed. Therefore, a thin device can be manufactured. Further, it is unnecessary to provide the circular arc gears and the walls along the entire peripheral surface of a rotation drum. In addition, the rear portion of the rotation drum is not used. Accordingly, a compact device can be manufactured, which is very effective for reducing the weight of the device and the number of parts.

BRIEF DESCRIPTION OF THE DRAWINGS

These and other objects and features of the present invention will become clear from the following description of the preferred embodiments thereof with reference to the accompanying drawings, in which:

FIG. 1 is a plan view showing a tape loading device according to one embodiment of the present invention;

DETAILED DESCRIPTION OF THE EMBODIMENTS

Figure 2:
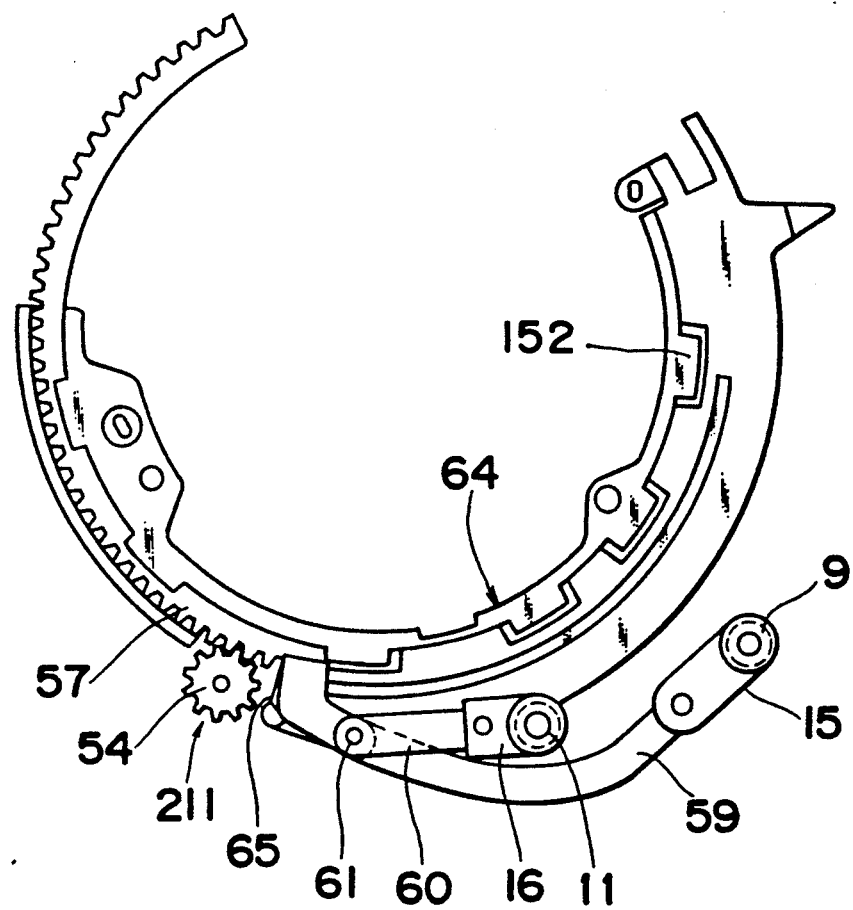
FIG. 2 is a plan view showing a driving mechanism for first and second loading roller posts.

Before the description of the present invention proceeds, it is to be noted that like parts are designated by like reference numerals throughout the accompanying drawings.

Figure 1:
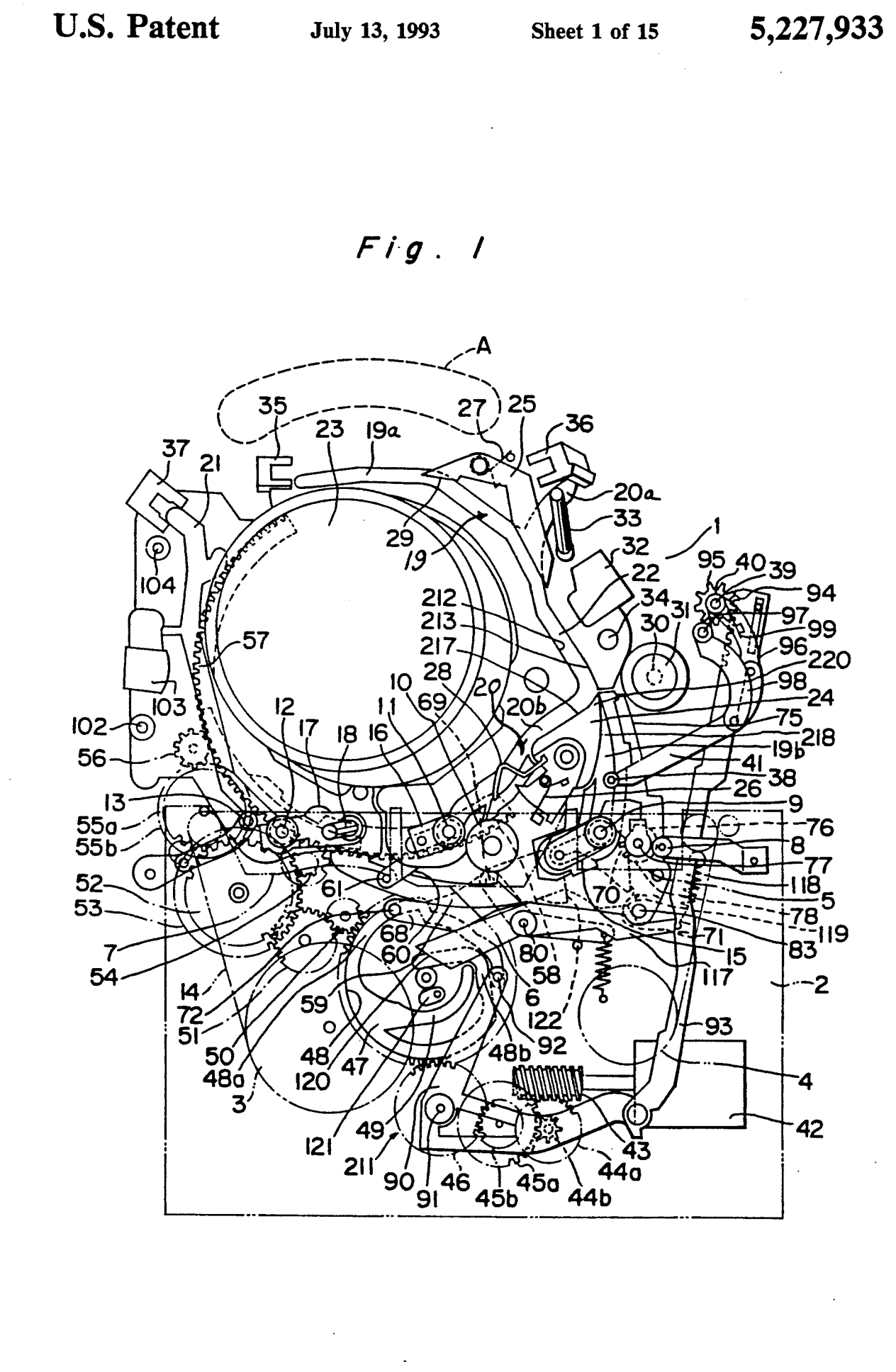
Figure 6:
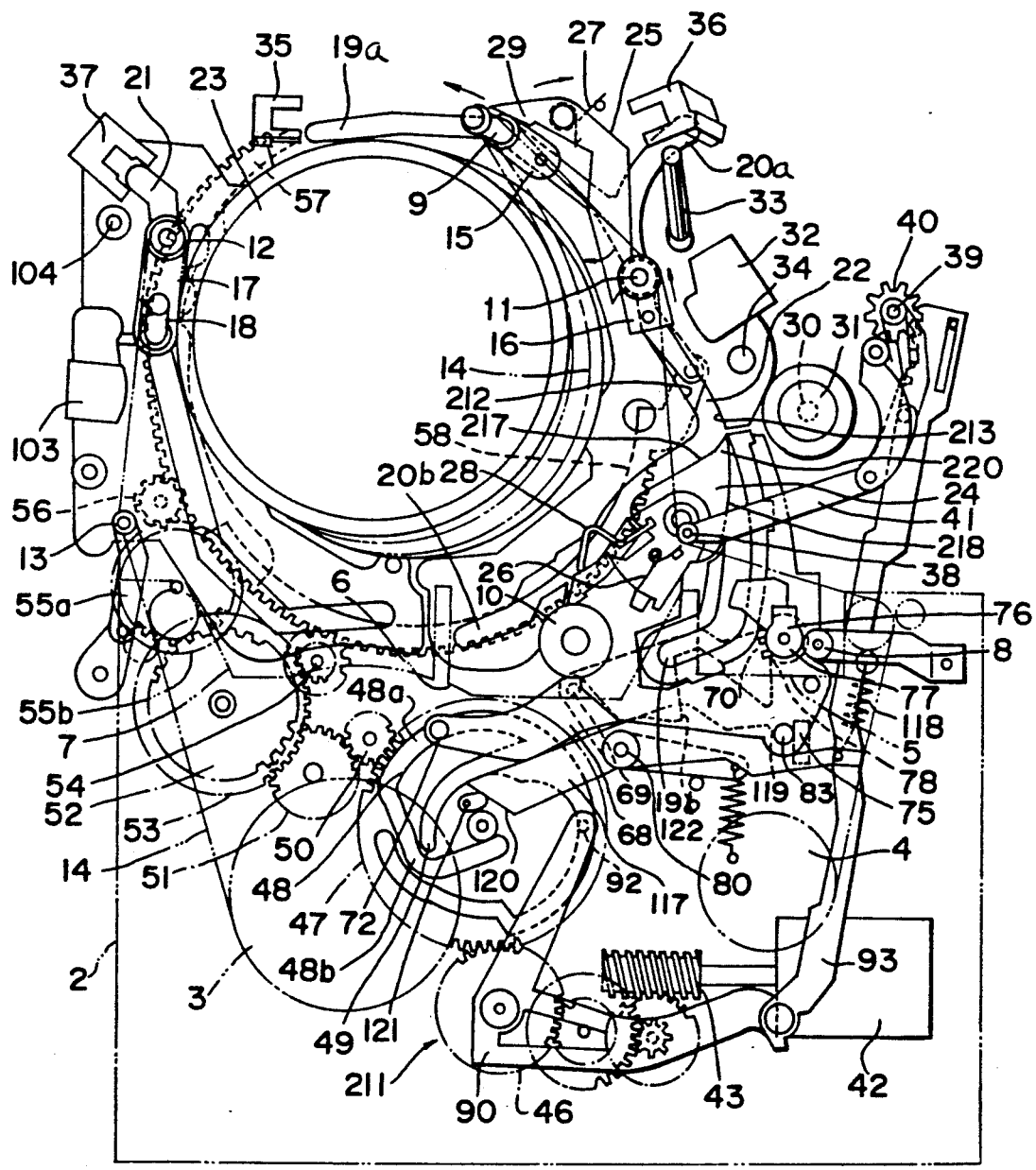
Figure 7:
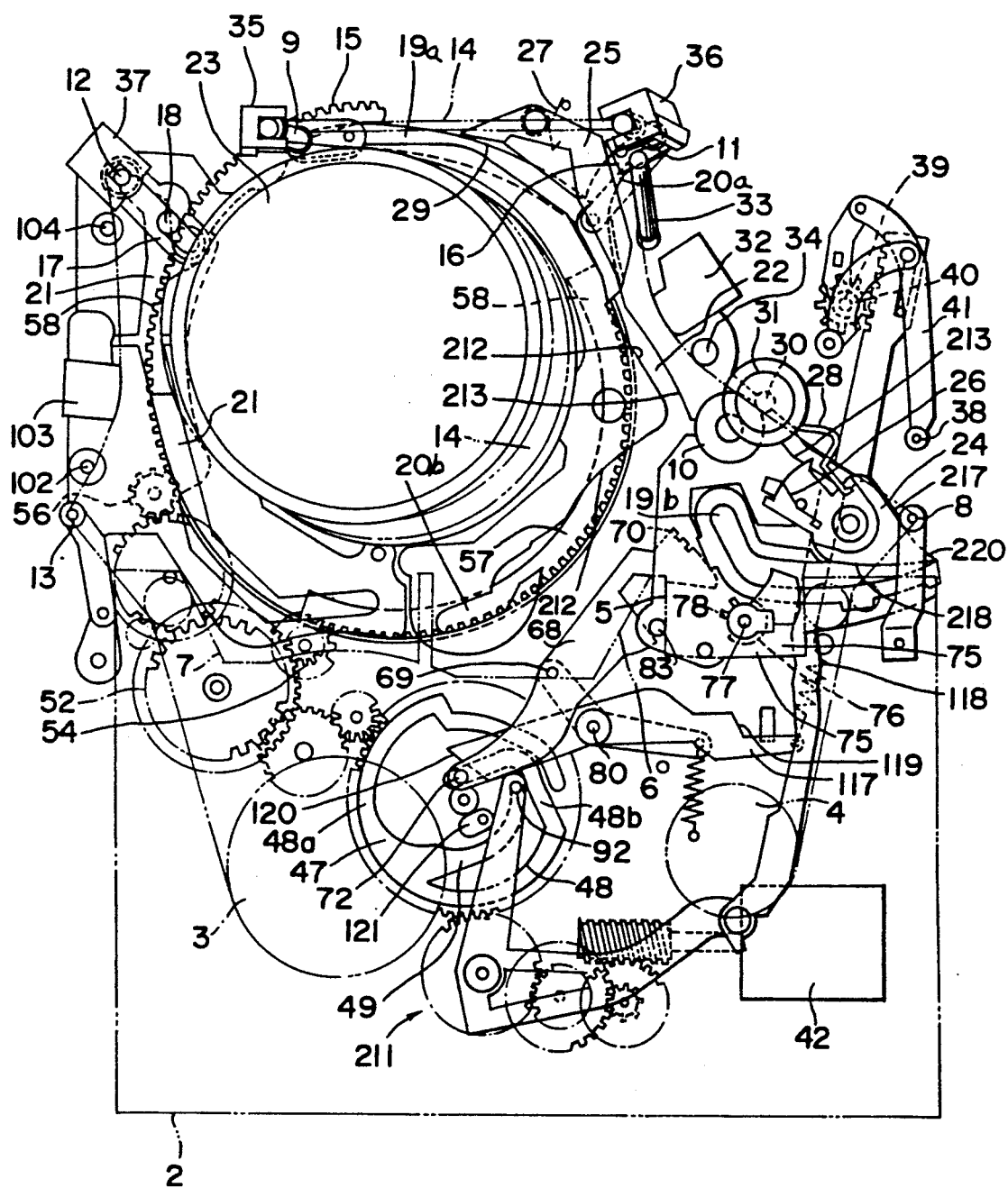
Figure 8:
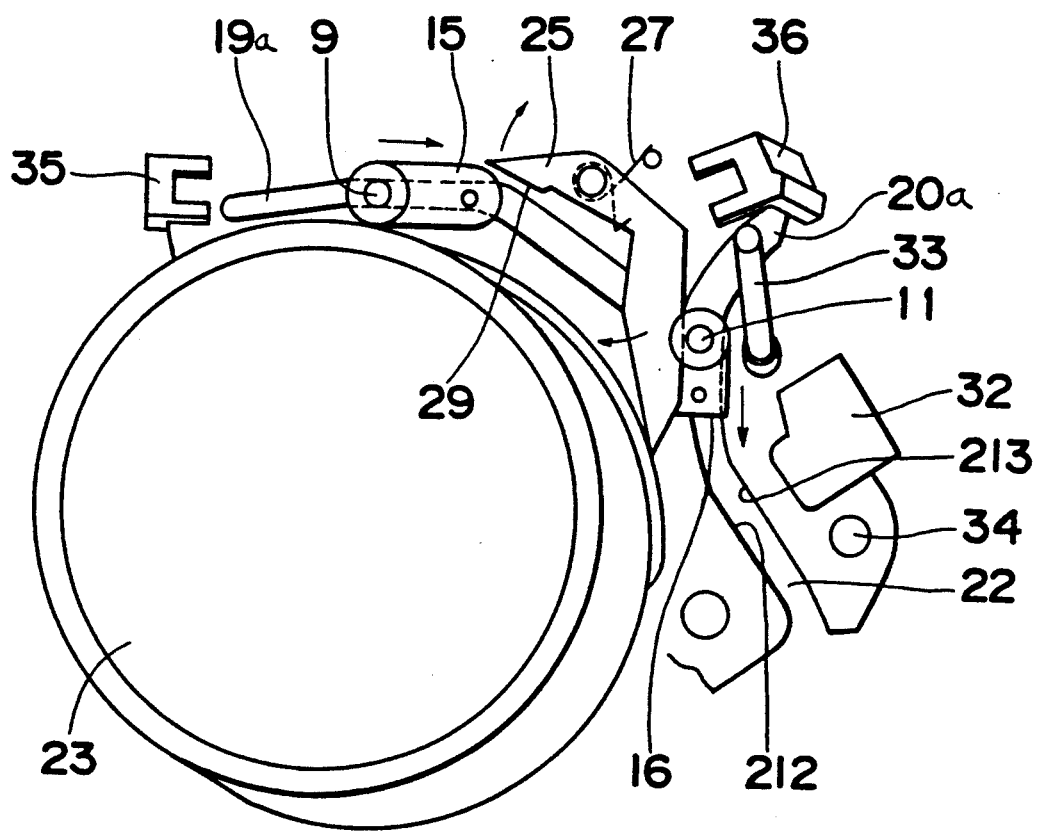

In FIG. 1, reference numeral 1 denotes a main body chassis. Reference numeral 2 designates a tape cassette mounted on the chassis 1. A supply side reel 3 and a winding side reel 4 are provided in the cassette 2. When the cassette 2 is mounted on the chassis 1, an expansion post 8 and a first loading roller post 9 of a recording/reproducing apparatus, a pinch roller 10 and a second loading roller post 11 thereof, a third loading roller post 12 and a tension post 13 thereof are inserted into respective cut-out portions 5, 6, and 7 formed in the front surface and bottom surface of the cassette 2 such that the above members are disposed inside a magnetic tape 14. The loading roller posts 9 and 11 each serve as a tape guide post. Reference numerals 15, 16, and 17 denote a first, second, and third boat having the first, second, and third loading roller post 9, 11, and 12 mounted thereon, respectively. In FIGS. 1, 6, and 7, the third boat 17 has a tilting post 18 as well as the third loading roller post 12 which is also inserted into the cut-out portion 7. Reference numerals 19, 20, and 21 denote a first, second, and third loading guides for guiding the first, second, and third boats 15, 16, and 17, respectively during a loading operation. The intermediate portions of the first and second loading guides 19 and 20 consist of a common guide 22. The positions of the first and second loading guides 19 and 20 are such that tape paths intersect and coincide along the loading completion portion 19a of the common guide 22. That is, the first loading guide 19 extends in the direction in which it approaches a rotation drum 23 and the loading completion portion 20a of the second loading guide 20 extends in the direction in which it moves away from the rotation drum 23. The third loading roller post 12 winds the magnetic tape 14 taken out of the supply side reel 3 around the rotation drum 23 from the left side in FIG. 1 when the third boat 17 moves along the third loading guide 21. The first loading roller post 9 winds the magnetic tape 14 taken out of the winding side reel 4 around the rotation drum 23 from the right side in FIG. 1 when the first boat 15 moves along the first loading guide 19 and the loading completion portion 19a of the common guide 22. The second boat 16 moves sequentially to the first boat 15 and the second loading roller post 11 expands the magnetic tape 14 taken out by the first loading roller post 9 toward the side of the drum 23 opposite to the first loading roller post 9. This expansion is necessary to secure the safe travel of the tape path of the magnetic tape 14 wound deeply around the rotation drum 23 by the first loading roller post 9 and wind the magnetic tape 14 around an audio control head 32. Reference numeral 24 denotes a flat swing type branch pointer arm provided on the entrance end of the common guide 22. Reference numeral 25 denotes a flat swing type branch pointer arm provided on the exit end of the common guide 22. The branch pointer arm 24 is urged by a spring 26 in a direction for normally closing the loading start portion 19b of the first loading guide 19, and the branch pointer arm 25 is urged by a spring 27 for in a direction normally closing the loading start portion 20b of the second loading guide 20 and is locked at a closing position by an appropriate stopper. The branch pointer arm 24 has a projection 28 extending into the loading start portion 20b of the second loading guide 20. The branch pointer arm 25 has a projection 29 extending into the loading portion 19a of the first loading guide 19. The projection 28 is made of an elastic, material deformable in the direction parallel with the plane of FIG. 1.

Figure 3:
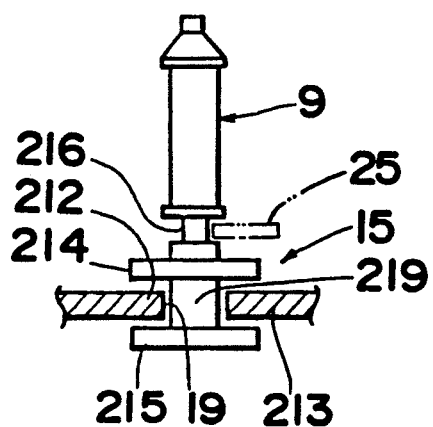
FIG. 3 is a front view showing the periphery of a loading roller post.

As shown in FIG. 3, the slot-shaped first loading guide 19 comprises a pair of edge portions 212 and 213 constituting both sides of the travel path of the first boat 15. The first boat 15 comprises a pin 219 positioned between the edge portions 212 and 213 and a pair of plates 214 and 215 on pin 219 arranged to sandwich the edge portions 212 and 213 from the front and back sides thereof. As described previously, the first loading post 9 projects upwardly from the boat 15, and a concave portion 216 having a small diameter is formed in the vicinity of the plate 214. The concave portion 216 can engage the branch pointer arm 25. The second and third loading guides 20 and 21 are constructed similarly to the first loading guide 19. The second and third boats 16 and 17 are constructed similarly to the first boat 15. The second loading roller post 11 is constructed similarly to the first loading roller post 9. The branch pointer arm 24 is at the same level as the edge portions 212 and 213, and at the position of the branch pointer arm 24, both side portions of the branch pointer arm 24 function as the edge portions 212 and 213 of part of the loading guides 19 and 20. The level of the branch pointer arm 25 is different from that of the first and second loading guides 19 and 20 and the common guide 22, and the branch pointer arm 25 is capable of performing a branch operation without being regulated by the guides 19, 20, and 22. Therefore, the branch pointer arm 25 engages the concave portion 216 as described previously. That is, when the first boat 15, of the first loading roller post 9 which moves prior to the second boat 16 in a loading operation, moves from the common guide 22 into the first loading guide 19 and presses the projection 29 of the branch pointer arm 25, the branch pointer arm 25 rotates against the force of the spring, thus allowing the succeeding second boat 16 of the second loading roller post 11 to move from the common guide 22 into the second loading guide 20. When the second boat 16, of the second loading roller post 11 which moves prior to the first boat 15 in an unloading operation, moves from the common guide 22 into the second loading guide 20 and presses the projection 28 of the branch pointer arm 24, the branch pointer arm 24 rotates against the force of the spring, thus allowing the succeeding first boat 15 to move into the first loading guide 19.

Reference numeral 30 denotes a capstan fixed to the chassis 1 outside the position for mounting the cassette 2. The upper and lower ends of the capstan 30 are supported by bearings 31. The pinch roller 10 moves from the cut-out portion 6 of the cassette 2 before the loading operation is completed, and contacts the capstan 30 under pressure and drives the magnetic, tape 14 with the magnetic tape 14 sandwiched there between. Reference numeral 32 designates an audio control head fixed to the chassis 1 between the loading terminating position of the second loading roller post 11 and the capstan 30. Reference numerals 33 and 34 denote fixed posts disposed on both sides of the audio control head 32. Stoppers 35, 36, and 37 for supporting each loading roller post 9, 11, and 12 are provided at each loading terminating position. The fixed post 33 is inclined. The fixed post 33 which is inclined and positioned in the vicinity of the second stopper 36 corrects the inclination of the magnetic tape 14 which has been caused, at the loading terminating position, by the first loading roller post 9 supported by the first stopper 35 and the second stopper 36 supported by the second stopper 36. Then, the magnetic tape 14 is returned to the horizontal path. Reference numeral 37 denotes a third stopper for supporting the third loading roller post 12 at the loading terminating position.

Reference numeral 38 denotes a loading auxiliary post to be brought in contact with the magnetic tape 14 during the loading operation. The loading auxiliary post 38 is interlocked with a boss 40 engaging a shaft 39 mounted on the chassis 1 and fixed to the top end of an arm 41 curvedly extending so as not to contact the capstan 30. Immediately after the first and second loading roller posts 9 and 11 pass the arm 41 during the loading operation, the arm 41 rotates and the loading auxiliary post 38 moves forward to the tape path along which the magnetic tape 14 is being taken out of the tape cassette 2. Then, the loading auxiliary post 38 presses the magnetic tape 14 to correct the twisting thereof, thus enabling an orderly and smooth loading operation of the magnetic tape 14. Immediately after the loading operation is completed, the loading auxiliary post 38 moves backward so that it does not prevent the pinch roller 10, which moves after the loading operation is completed, from pressing the capstan 30. At this time, the expansion post 8 is at the position shown in FIG. 7, thus allowing the magnetic tape 14 to pass the audio control head 32 and the capstan 30 smoothly.

Figure 11:
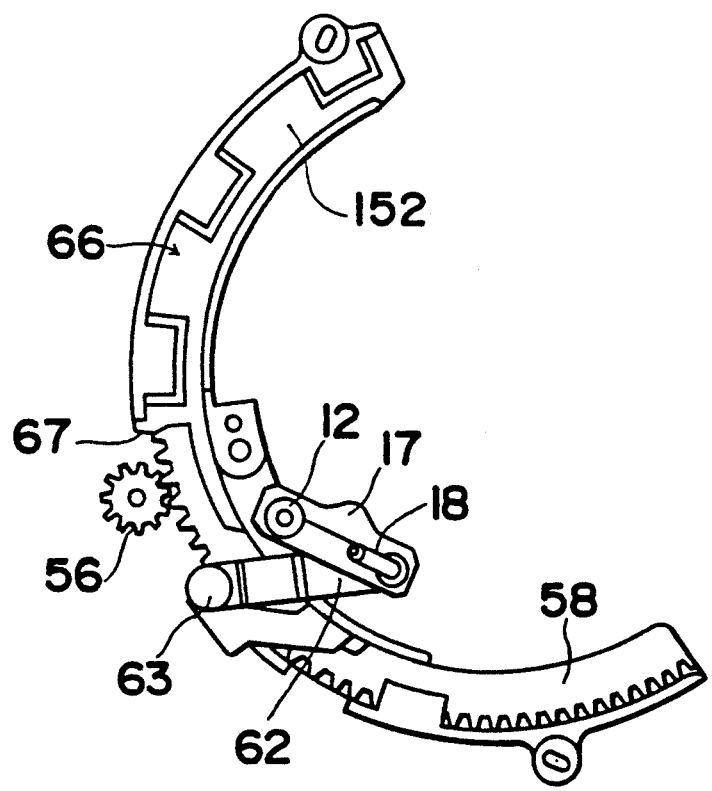
FIG. 11 is a partial plane view showing the tape loading device of the tape loading device.
Figure 16:
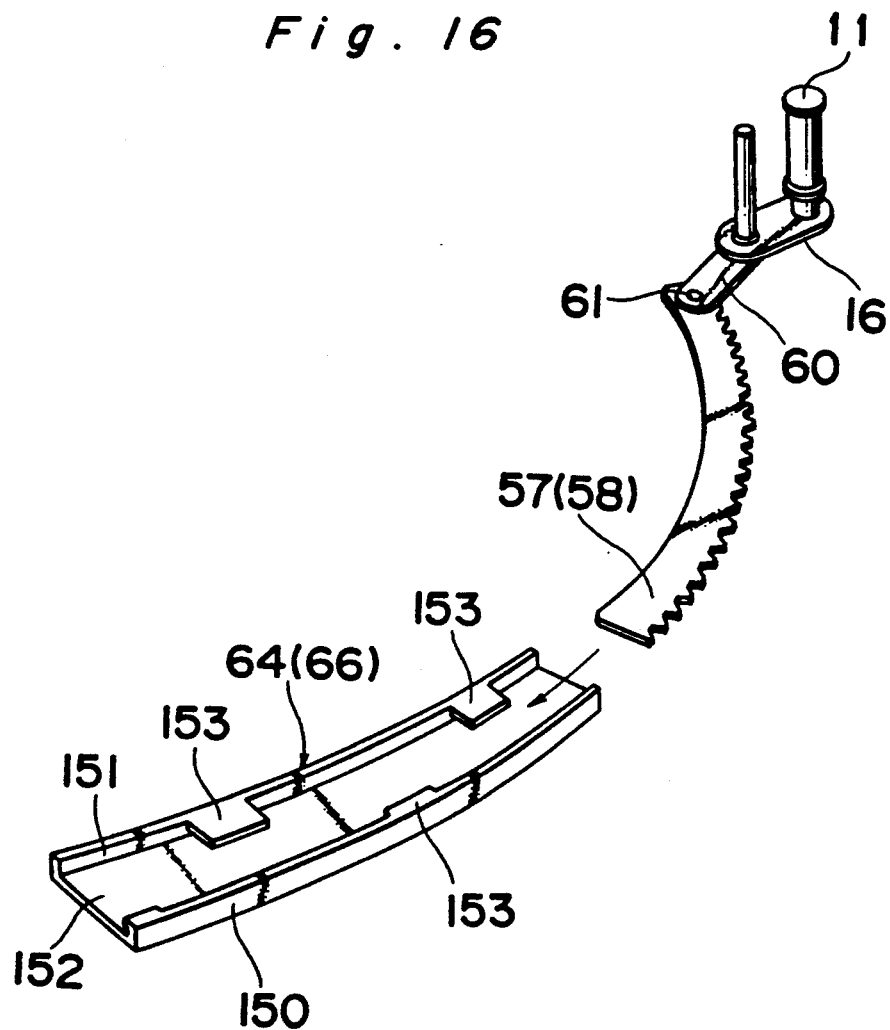
FIG. 16 is a perspective view showing the circular arc guide and the circular arc gear of the loading post driving device.
Figure 17:
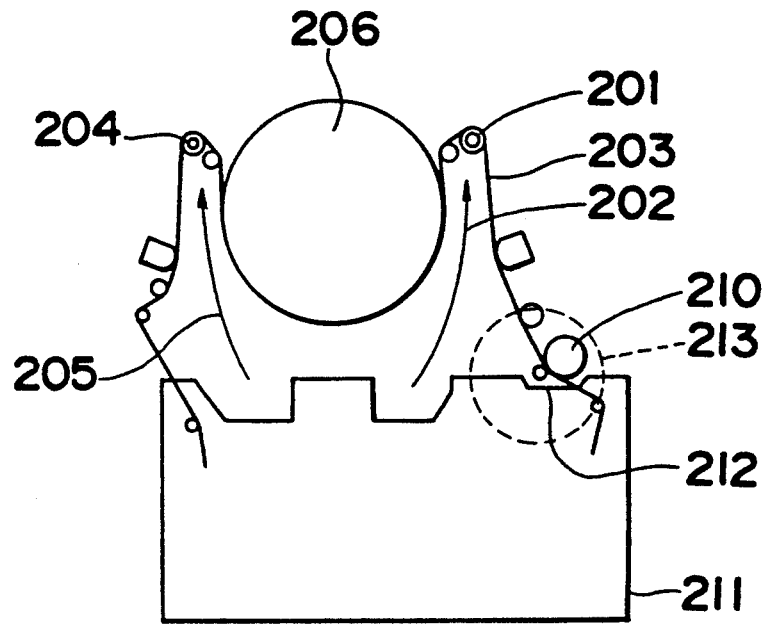
FIGS. 17 through 19 are schematic construction views showing a conventional tape loading device.
Figure 18:
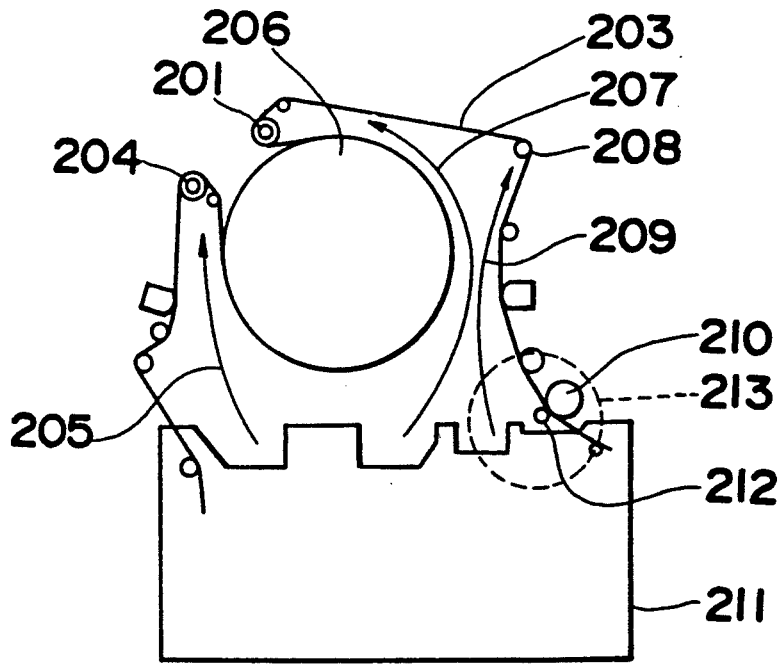
Figure 19:
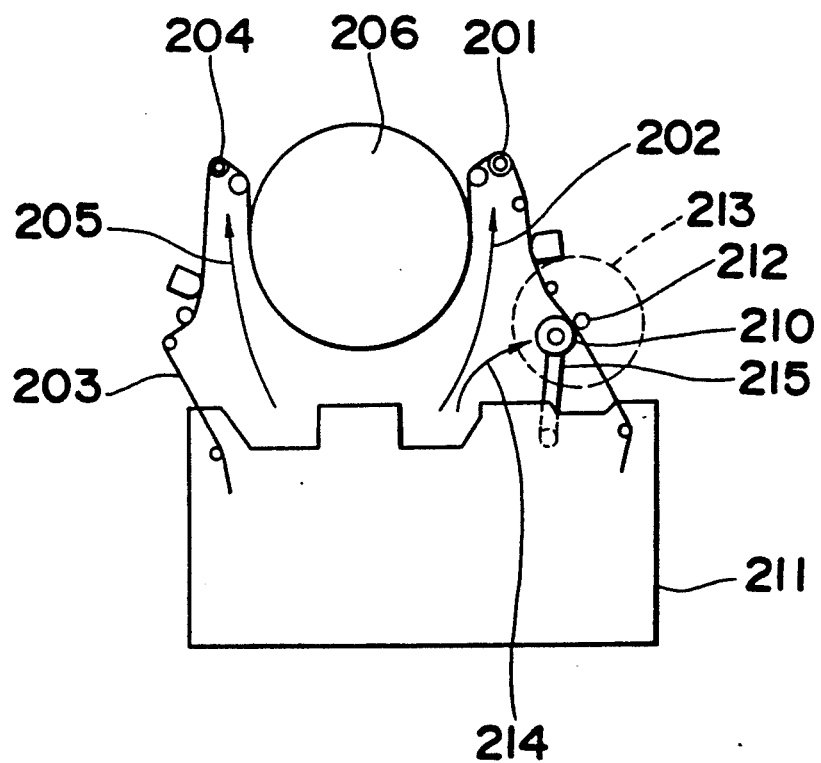

Next, each mechanism for performing the loading operation is described. Referring to FIG. 1, the driving force of a loading motor 42 is transmitted from a worm gear 43 to a cam gear 47 through gears 44a, 44b, 45a, 45b and 46. There are provided above the cam gear 47 a first cam groove 48 for driving the pinch roller 10 toward the capstan 30 and a second cam groove 49, branching from the vicinity of the termination of the first cam groove 48, for driving the loading auxiliary post 38. The rotational force of the cam gear 47 is transmitted to a loading main gear 52 through gears 50 and 51 engaging the gear 47, and then, to a first loading gear 54 through a gear 53 provided coaxially with the loading main gear 52, and further to a second loading gear 56 through gears 55a and 55b. In FIG. 1, reference numeral 57 denotes a first circular arc gear for driving the first boat 15 of the first loading roller post 9 and the second boat 16 of the second loading roller post 11. Reference numeral 58 denotes a second circular arc gear for driving the third boat 17 of the third loading roller post 12. As shown in FIG. 2 in detail, a first loading arm 59 which is comparatively long and a second loading arm 60 which is comparatively short are rotatably mounted on the first circular arc gear 57 through a pin 61. The first boat 15 of the first loading roller post 9 is rotatably mounted on the top end portion of the first loading arm 59 through a pin. The second boat 16 of the second loading roller post 11 is rotatably mounted on the top end portion of the second loading arm 60 through a pin. The first circular arc gear 57 is slidably guided by a circular arc guide 64 provided along the periphery (lower side in FIG. 2) of the rotation drum 23 and which is longer than the first circular arc gear 57 as shown in FIG. 16. The first loading gear 54 engages the first circular arc gear 57 through a cut-out portion 65 formed on the first circular arc guide 64, as shown in FIG. 2, thus driving the first circular arc gear 57 and moving the first boat 15 of the first loading roller post 9 and the second boat 16 of the second loading roller post 9 along the first loading guide 19 and the second loading guide 20, respectively. The second circular arc gear 58 is slidably guided by a second circular arc guide 66, provided along the peripheral surface of the rotation drum 23, longer than the second circular arc gear 58, as shown in FIGS. 11 and 16. The second loading gear 56 engages the second circular arc gear 58 through a cut-out portion 67 formed on the second circular arc guide 66, thus driving the second circular arc gear 58 and moving the third boat 17 of the third loading roller post 12 along the third loading guide 21. The positions of the first circular arc guide 64 and the second circular arc guide 66 are vertically displaced from each other, but partly overlap with each other vertically. The first and second circular arc gear 57 and 58 are vertically displaced from each other.

FIG. 16 is a perspective view showing the circular arc guide 64 (or 66) and the circular arc gear 57 (or 58) guided thereby. The circular arc guide 64 (or 66) has an outer wall 150 and inner wall 151 for guiding the peripheral surface and the inner peripheral surface of the circular arc gear 57 (or 58), respectively. These walls are integrally connected with each other through a bottom plate 152. A plurality of guiding plates 153 project circumferentially from the upper edge portions of both the outer wall 150 and the inner wall 151 (or the upper edge portion of either the outer wall 150 or the inner wall 151) toward the opposite wall, thus guiding the circular arc gear 57 (or 58) sliding along the circular arc guide 64 (or 66) so as to ensure the movement thereof. In FIGS. 2 and 11, in the case of the first circular arc guide 64, the guiding plates 153 are mounted on the upper edge portion of the inner wall thereof, and in the case of the second circular arc guide 66, the guiding plates 153 are mounted on the upper edge portion of the outer wall thereof.

In the above construction, the first and second circular arc guides 64 and 66 partly overlap with each other vertically on the cassette side, but it is unnecessary to space the first and second circular arc guides 64 and 66 from each other vertically while according to the conventional method, the first and second circular arc guides are spaced from each other. Therefore, a thin magnetic recording/reproducing apparatus can be manufactured. Further, it is unnecessary to provide the circular arc guides 64 and 66 along the entire periphery of the rotation drum 13. It is unnecessary as well to provide the circular arc gears 57 and 58 in a range beyond the movement range of the loading roller posts 7 and 8. Therefore, a region shown by (A) of FIG. 1 in the back of the rotation drum 13 is not used, which allows the manufacture of a compact loading post driving device. Accordingly, the device is light and the number of parts can be reduced.

The tooth portions of the circular arc gears 57 and 58 as shown are formed on the outer periphery, but they may be formed on the inner periphery.

The gears 52 and 53 and the gears 55a and 55b are each connected with a coil spring (not shown), of a certain length, disposed between each pair of gears and coaxial therewith. The coil springs do not prevent the smooth drive of the first loading gear 54 and the second loading gear 56. When the loading roller posts 9, 10, and 11 are stopped by the first, second, and third stopper 35, 36, and 17, respectively, the gears 53 and 55b rotate further to a small extent. As a result, each coil spring positioned between the gears 52 and 53 and between the gears 55a and 55b elongates, thus pressing the boats 15, 16, and 17 elastically against the corresponding stopper 9, 11, and 12. Therefore, the loading roller posts 9, 11, and 12 are reliably held by each stopper 9, 11, and 12.

Figure 12:
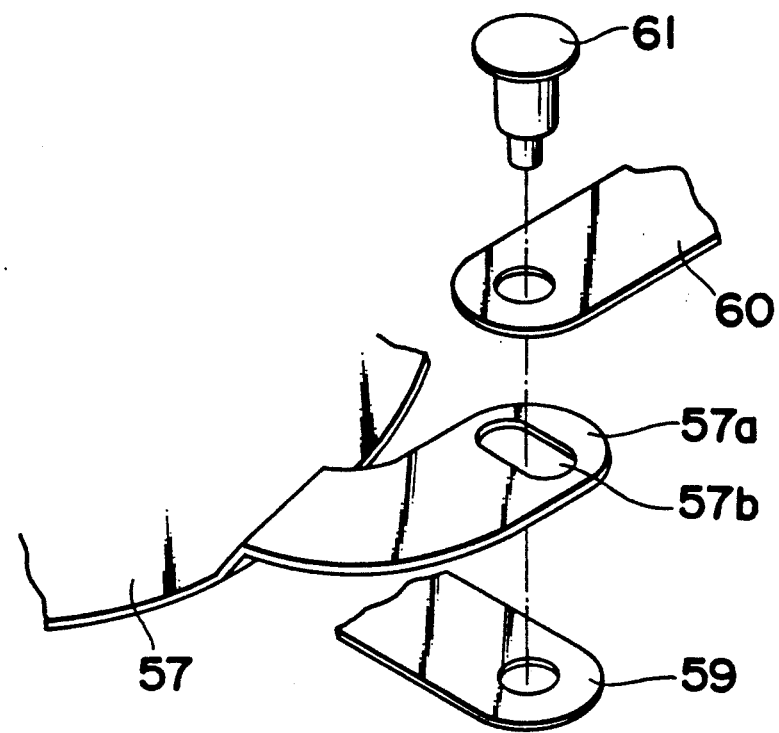
FIG. 12 is a schematic perspective view showing the construction of the mounting portion of a loading arm.

FIG. 12 shows in detail the connection of the mounting portion 57a of the first circular arc gear 57 and the first loading arm 59 as well as the second loading arm 60. There is formed on the mounting portion 57a an elongated opening 57b which substantially points to the center of the rotation drum 23. One end of a shaft 61 extending through the elongated opening 57b is crimped to the first loading arm 59 while the second loading arm 60 is rotatably supported by the shaft 61.

Referring to FIG. 1 and FIG. 7 reference numeral 68 denotes a sector arm for driving the pinch roller 10, the center portion of which is rotatably supported by a shaft 69. A plurality of teeth 70 are partly formed on a circular arc end portion of the sector arm 68. The remaining circular arc portion thereof is formed as a tooth-free portion 71. A cam pin 72 engaging the first cam groove 48 of the cam gear 47 is formed on the other end of the sector arm 68. Reference numeral 75 denotes an approximately fan-shaped pinch roller arm having the pinch roller 10 mounted thereon. A boss 76, provided in the center of the pinch roller arm 76, acting as the pivotal center thereof is rotatably supported by a shaft 77 on the chassis 1. The pinch roller 10 is mounted on the upper surface of one end portion of the pinch roller arm 75. The branch pointer arm 24 and the first loading guide 19 in the portion from the bottom to the entrance of the common guide 22 are provided on the upper surface of the remaining portion of the pinch roller arm 75. A plurality of teeth 78 which engage the teeth 70 of the sector arm 68, prior to the loading operation are formed on part of the peripheral surface of the boss 76 acting as the pivotal center of the pinch roller arm 75.

The cam gear 47 has teeth along the entire peripheral surface thereof with respect through the gear 46 to which the rotation force is transmitted from the loading motor 42 while it has a teeth-free portion (not shown) partly on the peripheral surface thereof with respect to the gear 50 through which the rotation force is transmitted from the loading motor 42 to the main gear 52. According to this, the movements of the loading roller posts 9, 11, and 12 are controlled.

Referring to FIG. 1, reference numeral 90 denotes an arm for driving the loading auxiliary post 38. The center portion thereof is rotatably supported by a shaft 91 on the chassis 1. A cam pin 92 engaging the first cam groove 48 of the cam gear 47 is formed on one end thereof. Reference numeral 93 denotes a toothed lever pivotally mounted on the other end of the arm 90. A rack 94 provided on the top end of the toothed lever 93 engages a gear 95 fixed to the boss 40 to which the arm 41 of the loading auxiliary post 38 is coupled. The arm 41 of the loading auxiliary post 38 and the boss 40 are connected to each other by a parallel link mechanism comprising a link 96 and a curved link 98. The link 96 is curved similarly to the arm 41, fixed to the boss 40, and connected to the arm 41. The link 98 connects the arm 41 and a shaft 97 mounted at a position spaced a short distance from the boss 40 to each other. The boss 40 is urged counterclockwise by a spring 99. The toothed lever 93 is always urged upward in FIG. 1. The arm 90 is urged counterclockwise. But the pin 92 of the arm 90 contacts the side wall of the first cam groove 48 and its position is regulated.

Figure 10:
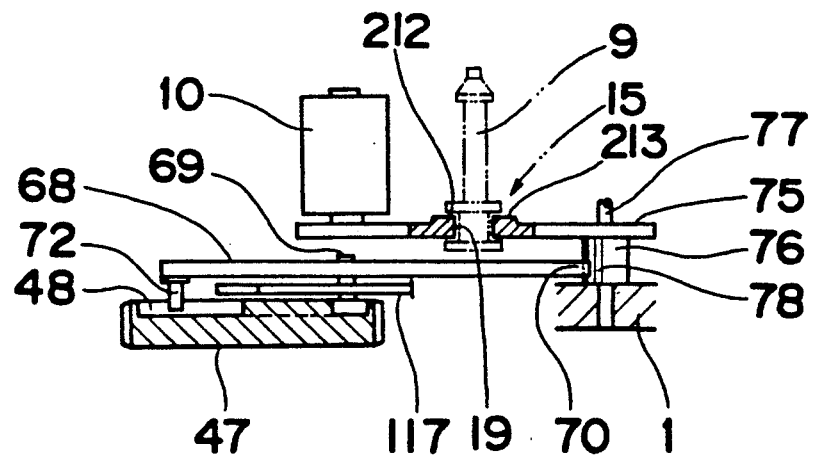
FIG. 10 is a front view showing the periphery of a pinch roller arm shown in FIG. 1.

Reference numeral 75 denotes a pivotal type pinch roller arm formed on an approximately fan-shaped plate. As shown in FIG. 10, a boss portion 76 which acts as the center of the pivotal motion of the pinch roller arm 75 is rotatably supported by a shaft 77 mounted on the chassis 1. The pinch roller 10 is mounted on the upper surface of the top portion of the pinch roller arm 75. A plurality of tooth portions 78 are formed on a part of the peripheral surface of the boss portion 76. Reference numeral 68 denotes a sector arm for driving the pinch roller arm 75. The center portion of the sector arm 68 is rotatably supported by a shaft 69, and a gear portion 70 which engages the tooth portion 78 of the boss portion 76 of the pinch roller arm 75 is formed on one end portion of the sector arm 68. A cam follower pin 72 is provided on the other end of the sector arm 68 and engages a cam groove 48 of the gear 47 constituting a part of a gear mechanism 211. The cam groove 48 has a circular arc portion 48a disposed along the periphery of the cam gear 47 and a bent portion 48b connected with the terminating portion of the circular arc portion 48a and bent toward the center of the cam gear 47. Reference numeral 117 denotes a press lever rotatably supported by a shaft 80. One end portion of the press lever 117 is urged counterclockwise in FIG. 10 by a spring 118. An edge 119 is formed on the press lever 117. The edge 119 engages a fixing pin 83 by being urged counterclockwise by the press lever 117, thus being capable of preventing the pivotal motion of the pinch roller arm 75. A cam face 120 is formed on the other end portion of the press lever 117. A cam strip 121 attached to the cam gear 47 is brought into contact with the cam face 120 by the rotation of the cam gear 47, thus rotating the press lever 117 clockwise in FIG. 10 against the force of a spring 118. Thus, the pin 83 is disengaged from the edge 119.

The loading start side portion of the first loading guide 19, the branch point arm 24, and parts on the periphery thereof are mounted on the pinch roller arm 75. The pinch roller arm 75 pivots together with the pinch roller 10. On the loading start side portion of the second loading guide 20 shown in FIG. 10, one edge portion 212 is fixed to the chassis 1 as shown in FIG. 7. The other edge 213 is provided on the pinch roller arm 75 and pivots together with the pinch roller arm 75.

Figure 4:
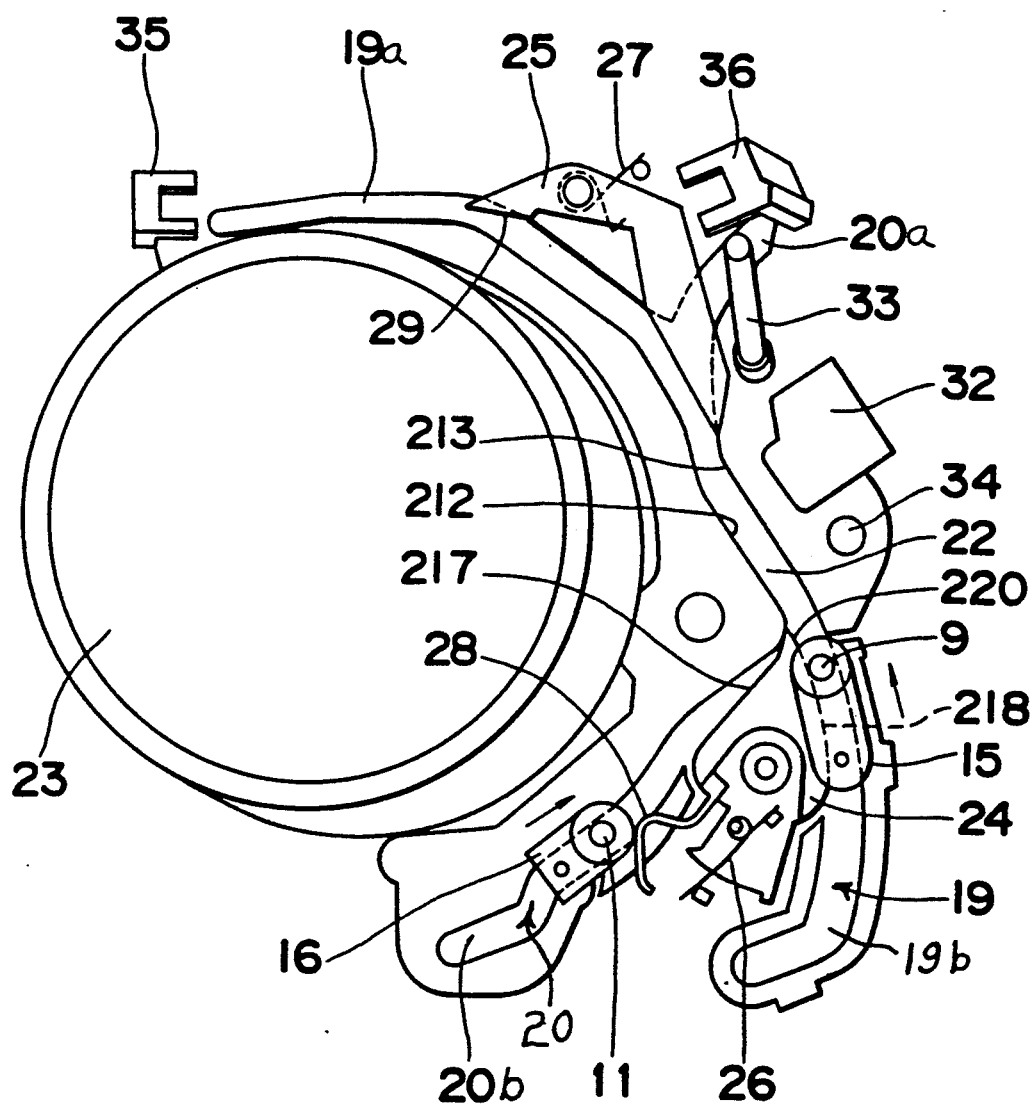
FIGS. 4 through 9 are explanatory views for explaining the operation of the tape loading device.
Figure 5:
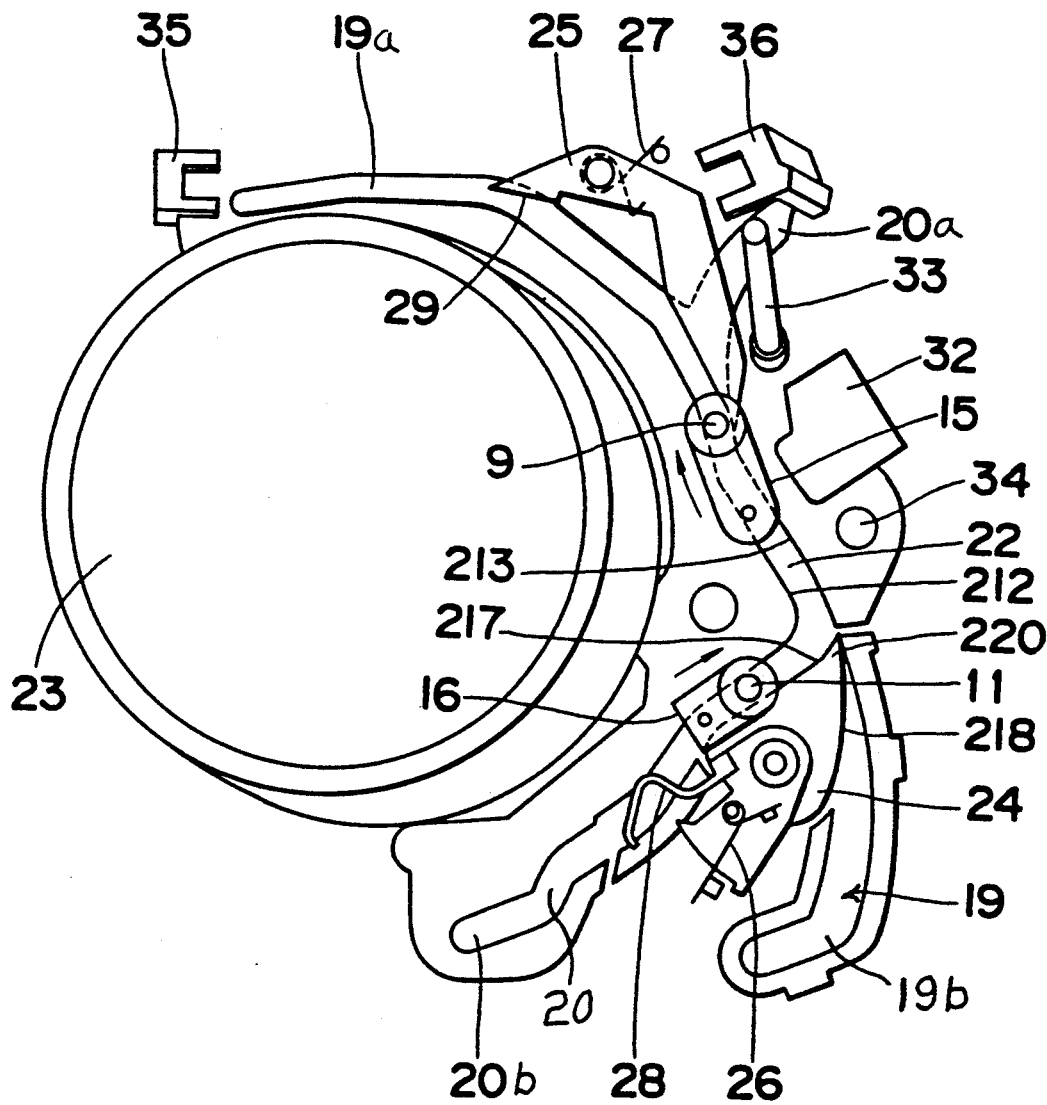

The loading operation of the magnetic tape 14 is described below. According to the driving force of the loading motor 42, the cam gear 47 rotates clockwise, the loading main gear 52 rotates counterclockwise, the first loading gear 54 rotates clockwise, and the second loading gear 56 rotates counterclockwise. Accordingly, the first circular arc gear 57 slides counterclockwise by the guidance of the first circular arc guide 64, while the second circular arc gear 58 slides clockwise by the guidance of the second circular arc guide 66. At this time, the first circular arc gear 57 drives the first boat 15 and the second boat 16 through the first loading arm 59 and the second loading arm 60, and the second circular arc gear 58 drives the third boat 17 through the third loading arm 62. Therefore, the first boat 15 is moved by being guided by the storage portion 19b of the first loading guide 19, the second boat 16 is moved by being guided by the storage portion 20b second loading guide 20, and the third boat 17 is moved by being guided by the third loading guide 21. The first boat 15 of the first loading roller post 9 passes the branch pointer arm 24 preceding to the second boat 16 of the second loading roller post 11. Then, both boats 15 and 16 move forward along the common guide 22. At this time, as shown in FIG. 4, the pin 219 of the first boat 15 contacts a side portion 218 of the branch pointer arm 24, thus opening the branch pointer arm 24. Thereafter, the first boat 15 moves into the common guide 22. During this period, the second boat 16 moves along the storage portion 20b of the second loading guide 20 and elastically deforms the projection 28, thus passing the projection 28. At this time, the arm 41 of the loading auxiliary post 38 projects, toward a position at which the loading auxiliary post 38 crosses the tape path, through the arm 90 which follows the first cam groove 48 of the cam gear 47 and the toothed lever 93, thus pressing a post which tilts a predetermined angle against the magnetic tape 14 from the outside of the tape loop. When the first boat 15 moves into the common guide 22, the branch pointer arm 24 closes the storage portion 19b of the first loading guide 19 again by the force of the spring 26 as shown in FIG. 5. Therefore, the storage portion 20b of the second loading guide 20 is connected with the common guide 22. As a result, the second boat 16 moves into the common guide 22 in subsequent to the first boat 15.

The branch pointer arm 25 is urged to close the loading portion 20a of the second loading guide 20 and open the loading portion of the first loading guide 19 by the urging force of the spring 27. Therefore, as shown in FIG. 5, the common guide 22 is connected with the loading portion 19b of the first loading guide 19, and the first boat 15 moves into the loading portion of the first loading guide 19. Thereafter, as shown in FIG. 6, the concave portion 216 of the first loading roller post 9 engages the projection 29 of the branch pointer arm 25. As a result, the first loading roller post 9 presses the projection 29. Consequently, the branch pointer arm 25 rotates clockwise in the drawings, thus opening the loading portion of the second loading guide 20. At this time, the second boat 16 is positioned in front of the branch pointer arm 25. Due to the engagement of the concave portion 216 with the branch pointer arm 25, the second boat 16 is guided by the branch pointer arm 25, thus moving into the loading portion 20a of the second load guide 20. The storage position 19a of the first loading guide 19 inclines inward toward the drum 23 in the vicinity of the first stopper 35 and the first loading roller 9 is supported by the first stopper 35 in a posture substantially conforming to the inclination of the rotation drum 23. Thus, the tape path in which the magnetic tape 14 has been wound around the rotation drum 23 is formed. The loading portion 20a of the second loading guide 20 tilts away from the drum in the vicinity of the second stopper 36 and the second loading roller post 11 is supported by the second stopper 36 in a posture substantially conforming to the inclination of the first loading roller post 9.

Simultaneously with the movement of the third boat 17 of the third loading roller post 12, the tension post 13 rotates to the position shown in FIG. 6. When the third loading roller post 12 is supported by the third stopper 37, the tension post 13 moves to the position shown in FIG. 7. There is formed a tape path comprising the supply side reel 3, the tension post 13, the fixed post 102, the erasing head 103, the fixed post 104, the third loading roller post 12, the tilting post 18 fixed to the third boat 17, and the rotation drum 23.

At this time, the cam pin 92 of the arm 90 related with the drive of the loading auxiliary post 38 moves along the second cam groove 49 of the cam gear 47. As a result, the loading auxiliary post 38 rapidly moves backward and at the same time, the cam pin 72 of the sector arm 68 moves along the first cam groove 48 of the cam gear 47, and the pinch roller arm 75 rotates, thus pressing the pinch roller 10 against the capstan 30. At the same time, the expansion post 8 rotates to the position shown in FIG. 7, thus expanding the tape path. Consequently, there is formed a tape path comprising the rotation drum 23, the first loading roller post 9, the second loading roller post 11, the fixed post 33, the audio control head 32, the capstan 30, the expansion post 8, and the winding side reel 4. The magnetic tape 14 smoothly travels through the tape path while it is being fed by the capstan 30.

Figure 13:
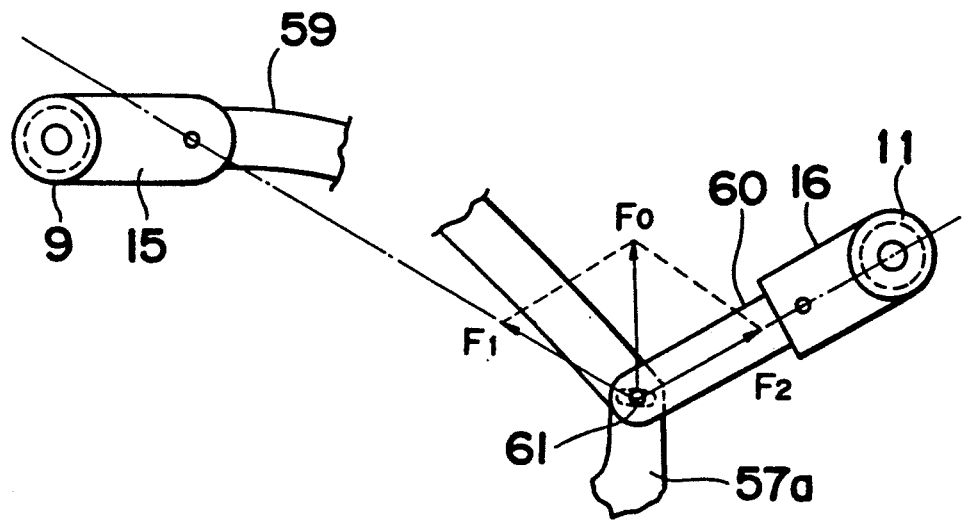
FIG. 13 is a view for explaining the force relationship between loading arms.
Figure 14:
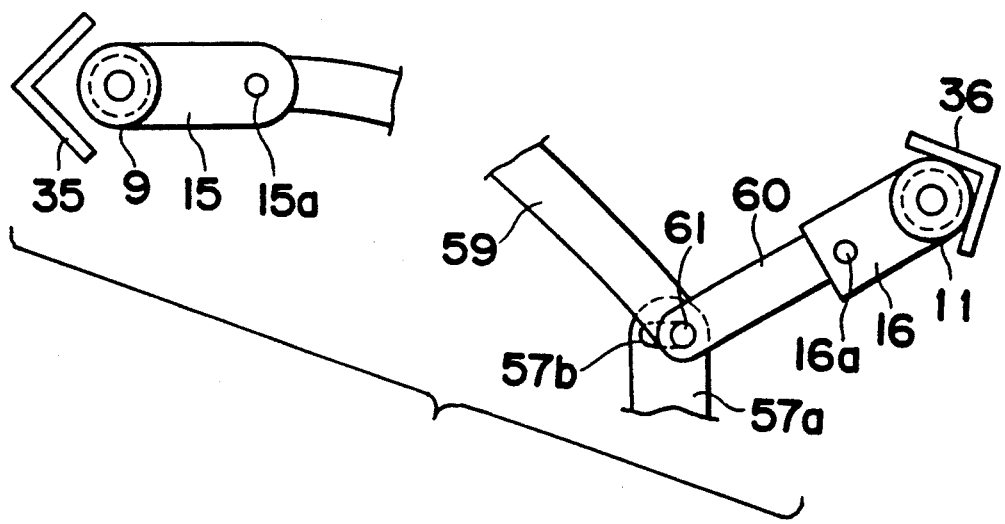
FIGS. 14 and 15 are views for explaining the final operation of the loading arm.
Figure 15:
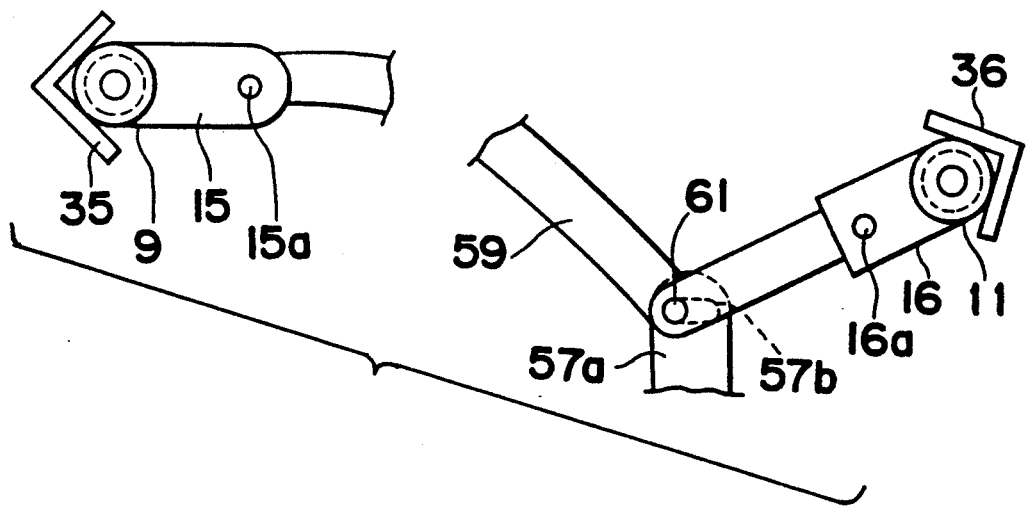

In the above operation, when the first loading roller post 9 and the second loading roller post 11 are held by pressing the first boat 15 and the second boat 16 against the first stopper 35 and the second stopper 36, respectively the shaft 61 moves within the elongated opening 57b of the mounting portion 57a. Therefore, the first boat 15 and the second boat 16 are pressed by a uniform force, and the first loading roller post 9 and the second loading roller post 11 are held by a uniform force, which stabilizes the travel of the magnetic tape 14. For example, as shown in FIG. 14, when the second boat 16 is pressed by the second stopper 36 first and the first boat 15 has not reached the position of the first stopper 35, the first circular arc gear 57 further rotates. As a result, as shown in FIG. 15, the shaft 61 moves within the elongated opening 57b of the mounting portion 57a, and the first boat 15 is pressed against the first stopper 35. Consequently, the first loading roller post 9 and the second loading roller post 11 are held by a uniform force. At this time, the angle made by the first and second loading arms 59 and 60 is wide as shown in FIG. 13. Therefore, pressing force $F_1$ applied from the shaft 61 with respect to the pin connection point 15a of the first boat 15 and the first loading arm 59 and pressing force $F_2$ applied from the shaft 61 with respect to the pin connection point 16a of the second boat 16 and the second loading arm 60 are obtained by the driving force $F_0$ of the first circular arc gear 57, smaller than $F_1+F_2$.

When the first and second loading roller post 9 and 11 reach the loading terminating position as shown in FIG. 7, they are supported by the stoppers 35 and 36, respectively and placed at a predetermined position. At this time, the branch pointer arm 25 is returned to the original position by the force of the spring 27, thus opening the loading portion 19a of the first loading guide 19 and closing the loading portion 20a of the second loading guide 20.

Simultaneously with the movement of the first and second boat 15 and 16 caused by the rotation of the first circular arc gear 57, the second circular arc gear 58 is driven by the loading motor 42 and the gear mechanism 211. As a result, the third boat 17 is moved, and the third loading roller post 12 reaches the position of the stopper 37 and is placed at a predetermined position as shown in FIG. 7.

As shown in FIG. 7, the pinch roller 10 is mounted on a plate-shaped pinch roller arm 75. According to the pivotal motion of the pinch roller arm 75, the pinch roller 10 which has been inserted into the cut-out portion 6 as shown in FIG. 1 is moved to the position at which it presses the capstan 30 under pressure as shown in FIG. 7. As such, the magnetic tape 14 is sandwiched between the pinch roller 10 and the capstan 30 as shown in FIG. 7. That is, until the state shown in FIG. 6 is reached, the cam pin 72 of the sector arm 68 is in engagement with the circular arc portion 48a of the cam groove 48, and the fixing pin 83 is in engagement with the edge 119 of the press lever 117. Therefore, the sector arm 68 is kept in the position shown in FIG. 1. In the state shown in FIG. 6, the cam strip 121 of the cam gear 47 rotated by the loading motor 42 is about to contact the cam face 120 of the lever 117. With the further rotation of the cam gear 47, the cam strip 121 presses the press lever 117 against the force of the spring 118. Thus, the pin 83 is disengaged from the edge 119.

At this point, the cam pin 72 reaches the bent portion 48b of the cam groove 48. The cam pin 72 guides the bent portion 48b, so that the sector arm 68 pivots counterclockwise about the shaft 69. As a result, the tooth portion 70 rotates the pinch roller arm 75 clockwise through the tooth portion 78, with the result that the pinch roller 75 moves along the path intersecting the travel path of the first boat 15 and contacts the capstan 30 as shown in FIG. 7. Thus, the magnetic tape 14 is sandwiched. There is provided on the sector arm 68 a tapered edge 122 which becomes spaced from the shaft 69 with the rotation of the sector arm in the counterclockwise direction about the shaft 69. The tapered edge 122 engages the fixing pin 83 of the pinch roller arm 75, thus generating a clockwise urging force. As a result, the pinch roller 10 is pressed by the capstan 30 with a predetermined force. When the tapered edge 122 and the fixing pin 83 engage with each other, the tooth portion 70 of the sector arm 68 moves away from the tooth portion 78 of the pinch roller arm 75 as shown in FIG. 7. Thus, both are disengaged from each other. The pinch roller arm 75 is not pivoted until the posts 9 and 11 reach in front of the terminating position of the travel path thereof and approach the stoppers 35 and 36 so as not to prevent the movements of the first and second loading roller post 9 and 11 described above. The storage portion 19b of the first loading guide 19, the branch pointer arm 24, and parts in the periphery thereof are mounted on the pinch roller arm 75. The pinch roller arm 75 pivots together with the pinch roller 10. Owing to this structure, the movement of the pinch roller 10 is not prevented irrespective of the provisions of the first loading guide 19 and the branch pointer arm 24. As shown in FIG. 7, in the storage portion 20b of the second loading guide 20, one edge portion 212 is formed on the chassis side. The other edge portion 213 is provided on the pinch roller arm 75 and pivots together with the pinch roller arm 75.

FIG. 7 shows the completion of the tape loading operation. The first, second, and third loading post 9, 11, and 12 are supported by the stoppers 35, 36, and 37, respectively and placed in position.

When the loading operation is completed, the magnetic tape 14 is wound in the tape path as shown in FIG. 7. That is, the magnetic tape 14 is wound around the rotation drum 23 through the supply side reel 3, the tension post 13, an erasing head 103, a fixed post 104, the third loading roller post 12, and a tilting post 18 fixed to the third boat 17. The magnetic tape 14 is wound around the winding side reel 4 through the tape path along which the rotation drum 23, the first loading roller post 9, the second loading roller post 11, the tilting fixed post 33, the audio control head 32, the fixed post 34, the capstan 30, and the expansion post 8.

The unloading operation is described below. When the loading motor 42 is reversed, the cam gear 47 rotates counterclockwise and the cam groove 48 guides the cam pin 72. As a result, the sector arm 68 rotates clockwise about the shaft 69 in FIG. 7. Consequently, the cam pin 72 is disengaged from the tapered edge 122 and the pressing force of the pinch roller 10 is reduced. Next, the pinch roller arm pivots toward the original position as a result of the engagement between the tooth portions 70 and 78. Then, the fixing pin 83 engages the edge 119 as a result of the disengagement of the cam strip 121 from the cam face 120. Thus, the pinch roller arm 75 is locked at the original position.

The above operation is completed in the initial stage of the unloading operation according to the configuration of the cam groove 48. Both boats 15 and 16 move into the common guide 22 with the further rotation of the loading motor 42. Then, the second boat 16 is guided by the branch pointer arm 24 and moves into the storage portion 20b of the second loading guide 20. Then, the second boat 16 presses the branch pointer arm 24. As a result, the storage portion 19b of the first loading guide 19 is opened and then, the first boat 15 moves thereinto. Similarly, the third boat 17 moves toward the storage portion side of the third loading guide 21. Thus, the unloading state as shown in FIG. 1 is obtained. That is, when the branch pointer arm 25 opens and the projection 29 moves away from the loading portion of the first loading guide 19, the first boat 15 passes the position of the projection 29. When the second boat 16 moves into the common guide 22 and the branch pointer arm 25 is returned to the original position by the force of the spring 27, the loading portion 19a of the first loading guide 19 is connected with the common guide 22. As a result, the first boat 15 moves into the common guide 22 subsequent to the second boat 16.

Figure 9:
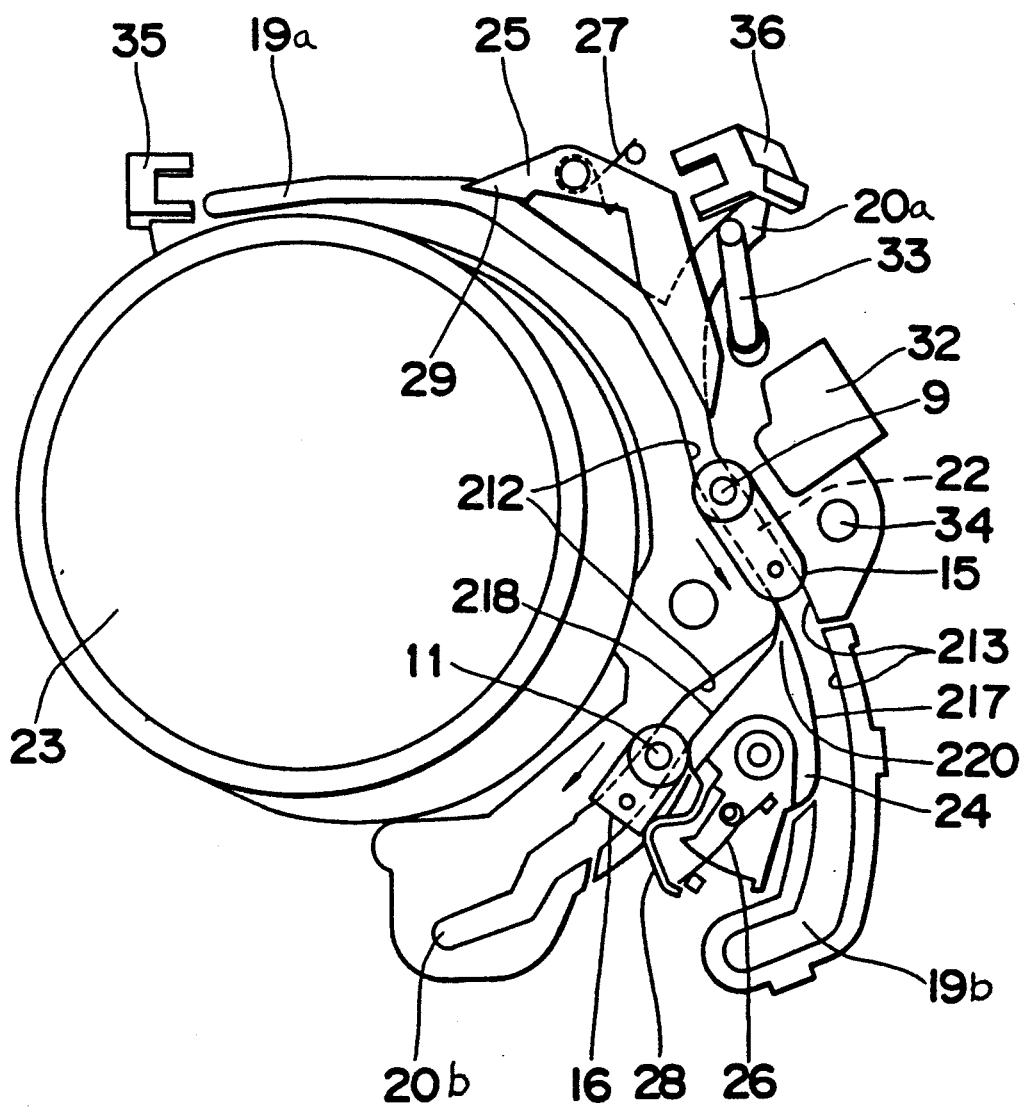

At this time, since the branch pointer 24 is urged to close the storage portion 19b of the first loading guide 19 by the spring 26 similarly to the case shown in FIG. 6, the common guide 22 is connected with the storage portion 20b of the second loading guide 20. Accordingly, the second boat 16 moves from the common guide 22 into the storage portion of the second loading guide 20. Then, the second boat 16 presses the projection 28 as shown in FIG. 9. As a result, the branch pointer arm 25 rotates counterclockwise in the drawings against the force of the spring 26 and a top portion 220 thereof contacts the edge portion 212. Thus, the storage portion 19b of the first loading guide 19 is opened. After the top portion 220 contacts the edge portion 212, the projection 28 is elastically deformed. As a result, the passage of the second boat 16 is permitted. At the same time, the first boat 15 moves away from the common guide 22 and moves into the storage portion of the first loading guide 19.

When the first and second boats 15 and 16 return into the cut-out portions 5 and 6 of the cassette 2, respectively and the unloading operation terminates, the branch pointer arm 24 is urged again to close the storage portion of the first loading guide 19 by the spring 26. During the unloading operation, the third boat 17 moves similarly and returns into the cut-out portion 7.

As described above, according to the embodiment of the present invention, the first and second loading guides for guiding the travels of the first and second tape guide posts for taking out a tape from a tape cassette and moving it to a predetermined position are partly joined into the same path. Therefore, it is only necessary to provide a space for one loading guide in the common guide and the movement distances of both tape guide posts can be equalized. Owing to this construction, both can be moved by the same driving mechanism, so that a compact magnetic recording/reproducing apparatus can be manufactured. In addition, one loading guide can be reliably alternately switched to the other loading guide and vice versa. Therefore, each tape guide post can be correctly guided to a predetermined loading guide or a predetermined loading terminating position. Furthermore, since the branch pointer arm constitutes a part of the edges of the first and second loading guides in the branch portion of the common guide and the first loading guide as well as second loading guide, the branch pointer arm has both a branching function and a guiding function of the tape guide post. Therefore, compared with a device comprising a member having a branching function and a member having a guiding function, the number of parts constituting the device can be reduced and the space for accomplishing both functions can be reduced.

As described above, according to the embodiment of the present invention, since a part of the storage portion of the loading guide for guiding the travel of the tape guide post is formed on the pinch roller arm itself, the interference between the loading guide and the pinch roller arm can be prevented without providing a non-interference space in the thickness direction therebetween although the travel path of the tape guide post and the movement path of the pinch roller intersect with each other. Thus, a compact apparatus can be manufactured.

According to the embodiment of the present invention, the two supporting bases can be simultaneously driven by one circular arc driving member. Compared with the conventional construction in which the supporting base is driven by separate driving means, the device according to the embodiment of the present invention can be easily constructed. Therefore, the embodiment of the present invention allows the manufacture of a compact magnetic recording/reproducing apparatus, which is very effective for a camera-integrated VTR.

The two loading arms are rotatably mounted on the mounting portion of the circular arc driving member with the elongated openings sandwiched between the two loading arms. Therefore, there is a possibility that an ununiform pressing force is applied to the supporting base of the loading roller post when the supporting base of the loading roller post is pressed against the stopper.

But the non-uniform pressing force applied to the supporting base is eliminated. This is because the shaft extending through the elongated opening of the circular arc driving member moves within the elongated opening. Accordingly, the two loading roller posts can be held with a uniform force, so that the travel of a magnetic tape can be stabilized. Further, the two loading arms are held by the stoppers with a wide the angle between the two loading arms. Therefore, a slight amount of pressing force applied to the shaft allows each supporting base to have a great force applied thereto. Thus, the loading roller post can be effectively held.

Furthermore, the two loading arms consist of long and short arms. Before a loading operation is started, a loading roller post corresponding to the long loading arm can be positioned a large distance away from the rotation drum. First, a magnetic tape is taken out of a tape cassette by the first loading roller post. The movement of the second loading roller post of the short loading arm can be started subsequent to the first loading roller post. While the two loading roller posts are moving, they can be moved in the direction in which they cross each other. At the loading terminating position, the first loading roller post can be positioned near the rotation drum while the second loading roller post is placed a distance away therefrom so as to expand the magnetic tape. Thus, the magnetic tape can be effectively taken out of the tape cassette by the two loading roller posts.

As described above, according to the embodiment of the present invention, the driving ring for driving the loading post has a circular arc shape and comprises a circular arc gear having a tooth portion on the outer peripheral or inner peripheral surface thereof. The circular arc gear is rotatably guided through the outer wall for guiding the peripheral and inner peripheral surface thereof along the peripheral surface of the rotation drum. Therefore, compared with the conventional construction in which the driving ring is rotatably guided by three ring supporting rollers, a thin loading post driving device can be manufactured. Particularly, the circular arc gear and the wall are not arranged along the entire peripheral surface of the rotation drum unlike the conventional device of this kind. Accordingly, a region at the rear of the rotation drum is unoccupied, which contributes to the manufacture of a compact loading post driving device. Thus, the device is light and the number of parts used is small.

The wall for guiding the outer peripheral and inner peripheral surface of the circular arc gear is integral. Therefore, the circular arc gear can be very easily mounted along the peripheral surface of the rotation drum with, for example, screws. Compared with the conventional device in which the ring supporting rollers are used, the construction of the device according to the embodiment of the present invention is very simple.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A tape loading device of a magnetic recording/reproducing apparatus having means for taking a magnetic tape out of a tape cassette and winding it around a rotary cylinder having a rotary magnetic head thereon for a recording/reproducing operation, the means for taking a magnetic tape out being constituted by a first tape guide post movable along a first travel path from a first loading start position on a tape winding reel side of the cassette to a first loading completion position along the periphery of the rotary cylinder spaced therearound from the cassette, and a second tape guide post movable along a second travel path from a second loading start position spaced toward a tape reel side of the cassette from said first loading start position to a second loading completion position spaced away from the periphery of the rotary cylinder, said device comprising:

a first loading guide having a first guide groove, said first guide groove having a first loading start portion extending from said first loading start position and a first loading completion portion extending to said first loading completion position and spaced from said first loading start portion;

a second loading guide having a second guide groove, said second guide groove having a second loading start portion extending from said second loading start position and a second loading completion portion extending to said second loading completion position and spaced from said second loading start portion;

a common loading guide having a common guide groove, said first and second loading start portions extending into a first end of said common guide groove and said first and second loading completion portions extending from a second end of said common guide groove;

a first tape guide post supporting member on which said first tape guide post is mounted and movable along said first guide groove and said common guide groove;

a second second tape guide post supporting member on which said second tape guide post is mounted and movable along said second guide groove and said common guide groove; and guide post driving means connected to said tape guide post supporting members for driving the respective tape guide post supporting members along said guide grooves from the first loading start position to the first loading completion position and back and from the second loading start position to the second loading completion position and back.

2. A tape loading device as claimed in claim 1 further comprising supporting member switching means at at least one end of said common guide groove for switching a supporting member moving along said common guide groove to a desired one of first and second loading guide portions constituted by the first and second loading start portions and the first and second loading completion portions.

3. A tape loading device as claimed in claim 2 in which said switching means comprises a branch pointer arm swingably mounted at one end of said common guide groove and movable between a normal position in which said pointer arm blocks off one of the first and second loading guide portions and leaves the other loading guide portion open to said common guide groove, urging means urging said pointer arm to said normal position, and swinging means connected to said pointer arm for, after a first supporting member has moved from said common guide groove past said pointer arm into other of said first and second loading guide portions, swinging said pointer arm to a further position in which said pointer arm blocks off the other of said first and second loading guide portions and opens said one loading guide portion.

4. A tape loading device as claimed in claim 3 in which there is a pointer arm at each end of said common guide groove movable between a normal position in which said pointer arm blocks off one of said first and second loading guide portions at the corresponding end of the common guide groove and leaves the other loading guide portion open to said common guide groove, urging means urging each said pointer arm to said normal position, and swinging means connected to each said pointer arm for, after a first supporting member has moved from said common guide groove past a respective pointer arm into other of the first and second loading guide portions, swinging the respective pointer arm to a further position in which said pointer arm blocks off the other of the loading guide portions and opens the one loading guide portion.

5. A tape loading device as claimed in claim 3 in which said swinging means is a switch projection on said pointer arm extending at least partly across the other of the first and second loading guide portions and engagable by the supporting member moving into said other of the first and second loading guide portions to swing said pointer arm against the urging force of said urging means to open the other of the first and second loading guide portions.

6. A tape loading device as claimed in claim 5 in which said urging means comprises means for urging said pointer arm to the normal position with a force which is overcome when a supporting member in said one of said first and second loading guide portions is moved from said one of said first and second loading guide portions into said common loading guide portion, whereby said pointer arm is swung to said further position to move said switch projection out of said other of the first and second loading guide portions to permit the supporting member in the other of said first and second loading guide portions to be moved toward said common loading guide portion.

7. A tape loading device of a magnetic recording/reproducing apparatus having means for taking a magnetic tape out of a tape cassette and winding it around a rotary cylinder having a rotary magnetic head thereon for a recording/reproducing operation, the means for taking a magnetic tape out being constituted by a first tape guide post movable along a first travel path from a first loading start position on a tape winding reel side of the cassette to a first loading completion position along the periphery of the rotary cylinder spaced therearound from the cassette, and a second tape guide post movable along a second travel path from a second loading start position spaced toward a tape reel side of the cassette from said first loading start position to a second loading completion position spaced away from the periphery of the rotary cylinder, said device comprising:

a first loading guide having opposite side edge portions defining a first guide groove, said first guide groove having a first loading start portion extending from said first loading start position and a first loading completion portion extending to said first loading completion position and spaced from said first loading start portion;

a second loading guide having opposite side edge portions defining a second guide groove, said second guide groove having a second loading start portion extending from said second loading start position and a second loading completion portion extending to said second loading completion position and spaced from said second loading start portion;

a common loading guide having opposite side edges defining a common loading guide groove, said first and second loading start portions extending into a first end of said common loading guide grove and said first and second loading completion portions extending from a second end of said common loading guide groove;

a first tape guide post supporting member on which said first tape guide post is mounted and having a projection on a bottom thereof movably engaged between the opposite side edges of said first guide groove for being movable along said first guide groove and said common loading guide groove;

a second tape guide post supporting member on which said second tape guide post is mounted and having a projection on a bottom thereof movably engaged between the opposite side edges of said second guide groove for being moved along said second guide groove and said common loading guide groove;

the projections on the bottoms of the first and second tape guide post supporting members being movably engaged between the opposite edge portions of said common loading guide groove;

a first branch pointer arm swingably mounted at the end of said common loading guide groove corresponding to said loading start portions of said first and second guide grooves and movable between a normal position in which said pointer arm blocks off one of said loading start portions and leaves the other loading start portion open to said common loading guide groove;

urging means urging said first branch pointer arm to said normal position;

said first branch pointer arm being switched to open the one of said loading start portions by the supporting member in the one of said loading start portions moving past said first branch pointer arm and into said common loading guide groove;

said first branch pointer having a first switch projection at one end thereof extending at least partly across the other of the first and second loading start portions and a first switch portion at the other end thereof, the first switch portion having a first switch edge portion constituting a part of one of the side edge portions of the first loading start portion and a second switch edge constituting a part of one of the side edge portions of the second loading start portion for guiding the corresponding tap guide port supporting members between said first and second loading start portions and said common loading guide groove, whereby after one of the tape guide post supporting members is guided into the other of the first and second loading start portions with the projection on the bottom of the one of the tape guide post supporting members being movably guided by the first switch edge and an opposite side edge portion of the loading start portion, the supporting member contacts said first switch projection to swing the first branch pointer arm against an urging force of said urging means so as to close said other loading start portion and open the one loading start portion, and then the other of the tape guide post supporting members is guided into the one loading start portion with the projection on the bottom of the other of the tape guide post supporting members movably guided by the second switch edge and an opposite side edge portion of the loading start portion.

8. A tape loading device as claimed in claim 7 further comprising:

a second branch pointer arm swingably mounted at the end of said common loading guide groove corresponding to said loading completion portions of said first and second guide grooves and movable between a normal position in which said pointer arm blocks off one of said loading completion portions and leaves the other loading completion portion open to said common loading guide groove;

further urging means urging said second branch pointer arm to said normal position;

said second branch pointer arm being switched to open the one of said loading completion portions by the supporting member in the other of said loading completion portions moving past said second branch pointer arm and into said common loading guide groove;

said second branch pointer having a second switch projection at one end thereof extending at least partly across the other of the first and second loading completion portions and a second switch portion at the other end thereof, the second switch portion having a third switch edge portion constituting a part of one of the side edge portions of the first loading completion portion and a fourth switch edge constituting a part of one of the side edge portions of the second loading completion portion for guiding the corresponding tape guide port supporting members between said first and second loading completion portions and said common loading guide groove, whereby after one of the tape guide post supporting members is guided into the other of the first and second loading completion portions with the projection on the bottom of the one of the tape guide post supporting members being movably guided by the third switch edge and an opposite side edge portion of the loading completion portion, the supporting member contacts said second switch projection to swing the second branch pointer arm against an urging force of said further urging means so as to close said other loading completion portion and open the one loading completion portion, and then the other of the tape guide post supporting members is guided into the one loading completion portion with the projection on the bottom of the other of the tape guide post supporting members movably guided by the fourth switch edge and an opposite side edge portion of the loading completion portion.

9. A tape loading device of a magnetic recording/reproducing apparatus having means for taking a magnetic tape out of a tape cassette and winding it around a rotary cylinder having a rotary magnetic head thereon for a recording/reproducing operation, the means for taking a magnetic tape out being constituted by a tape guide post movable along a travel path from a loading start position a adjacent the cassette to a loading completion position along the periphery of the rotary cylinder spaced therearound from the cassette, said device comprising:

a loading guide having a guide groove, said guide groove having a loading start portion extending from said loading start position and a loading completion portion extending to said loading completion position from said loading start portion;

a tape guide post supporting member on which said tape guide post is mounted and movable along said guide groove;

a pivotally mounted pinch roller arm pivotal about a pivotal axis from a loading start position to a loading completion position, said pinch roller arm having said loading start portion of said guide groove therein and positioned to be aligned with said loading completion portion when said pinch roller arm is in the loading start position;

a pinch roller mounted on said pinch roller arm; and means for pivotally moving said pinch roller arm for moving said pinch roller along a path which intersects said travel path and from a position inside said tape cassette to a position against a capstan for holding a tape taken out of the cassette between the pinch roller and the capstan.

10. A tape loading device of a magnetic recording/reproducing apparatus having means for taking a magnetic tape out of a tape cassette and winding it around a rotary cylinder having a rotary magnetic head thereon for a recording/reproducing operation, the means for taking a magnetic tape out being constituted by a first tape guide post movable along a first travel path from a first loading start position on a tape winding reel side of the cassette to a first loading completion position along the periphery of the rotary cylinder spaced therearound from the cassette, and a second tape guide post movable along a second travel path from a second loading start position spaced toward a tape reel side of the cassette from said first loading start position to a second loading completion position spaced away from the periphery of the rotary cylinder, said device comprising:

a first loading guide having a first guide groove, said first guide groove having a first loading start portion extending from said first loading start position and a first loading completion portion extending to said first loading completion position from said first loading start portion;

a second loading guide having a second guide groove, said second guide groove having a second loading start portion extending from said second loading start position and a second loading completion portion extending to said second loading completion position from said second loading start portion;

a first tape guide post supporting member on which said first tape guide post is mounted and movable along said first guide groove;

a second tape guide post supporting member on which said second tape guide post is mounted and movable along said second guide groove;

a circular arc driving member reciprocally movable along a circular arc path around a periphery of the rotary cylinder;

a first loading arm having one end rotatably mounted on said circular arc driving member and the other end rotatably connected with said first tape guide post supporting member;

a second loading arm having one end rotatably mounted on a connecting portion of said first loading arm where said first loading arm is rotatably mounted on said circular arc driving member and the other end rotatably connected with said second tape guide post supporting member; and means for reciprocally moving said circular arc driving member along said circular arc path;

whereby the circular arc driving member reciprocally moves around the periphery of the rotary cylinder to move the first and second tape guide posts on the respective supporting members between the loading start position and the loading completion position.

11. A tape loading device as claimed in claim 10 in which said circular arc driving member has an elongated opening therein extending toward a center of curvature of the circular arc along which said circular arc driving member moves, said elongated opening being at the position of connection of the first loading arm to said circular arc driving member; and said first loading arm having a shaft rotatably extending through said opening, and said second loading arm having a hole at the end thereof which is mounted on said connecting portion and through which said shaft extends for connecting the first and second loading arms and the circular arc driving member, said shaft being movable along said elongated opening together with first and said second loading arms with respect to said circular arc driving member.

12. A tape loading device as claimed in claim 10 in which said first loading arm has a length greater than the length of said second loading arm for permitting the travel path of said second tape guide post supporting member to intersect the travel path of said first tape guide post supporting member with respect to a center of curvature of the circular arc along which said circular arc driving member moves from the unloading start positions of the first and second tape guide posts to the loading completion positions of the first and second tape guide posts, whereby the loading start position of the second tape guide post can be near the cylinder as compared with the loading start position of the first tape guide post with respect to the center of curvature, and the loading completion position of the first tape guide post can be near the cylinder as compared with the loading completion position of the second tape guide post with respect to the center of curvature.

13. A tape loading device as claimed in claim 12 further comprising a linking mechanism connecting said second tape guide post supporting member with said first loading arm.

14. A tape loading device of a magnetic recording/reproducing apparatus having means for taking a magnetic tape out of a tape cassette and winding it around a rotary cylinder having a rotary magnetic head thereon for a recording/reproducing operation, the means for taking a magnetic tape out being constituted by a tape guide post movable along a travel path from a loading start position a adjacent the cassette to a loading completion position along the periphery of the rotary cylinder spaced therearound from the cassette, said device comprising:

a loading guide having a guide groove, said guide groove having a loading start portion extending from said loading start position and a loading completion portion extending to said loading completion position from said loading start portion;

a tape guide post supporting member on which said tape guide post is mounted and movable along said guide groove;

a circular arc driving member reciprocally movable along a circular arc path around a periphery of said rotary cylinder, said circular arc driving member having an outer peripheral and inner peripheral edge, a circular arc gear having gear teeth along one of said peripheral edges with the pitch circle thereof being concentric with the the center of curvature of said circular arc path, and a cylindrical surface on the other of said peripheral edges having a center of curvature coincident with the center of curvature of said circular arc path; and a circular arc guide member in which said circular arc driving member is guided in reciprocal movement, said guide member having a first circular arc-shaped peripheral wall having a radius substantially the same as the radius of the addendum circle of said gear teeth on said circular arc gear and having said circular arc gear in sliding engagement therewith, and a second circular arc-shaped peripheral wall having substantially the same radius as the radius of the arc along which said cylindrical surface extends and with which said cylindrical surface is in sliding engagement, whereby said circular arc driving member moves while being held between said first and second arc-shaped peripheral walls.

15. A tape loading device as claimed in claim 14 in which said circular arc guide member and said peripheral walls are integral.

16. A tape loading device as claimed in claim 14 in which said first and second arc-shaped peripheral walls have inwardly extending flanges thereon over the circular arc driving member for holding said circular arc driving member in said circular arc guide member as said circular arc driving member moves therealong.

17. A tape loading device as claimed in claim 16 in which said flanges are parallel to a surface of said circular arc driving member over which said flanges extend, and said flanges are integral with said peripheral walls.

* * * * *